United States Patent
Lussier et al.

(10) Patent No.: US 6,403,526 B1
(45) Date of Patent: Jun. 11, 2002

(54) ALUMINA TRIHYDRATE DERIVED HIGH PORE VOLUME, HIGH SURFACE AREA ALUMINUM OXIDE COMPOSITES AND METHODS OF THEIR PREPARATION AND USE

(75) Inventors: Roger Jean Lussier, Ellicott City; Michael David Wallace, Columbia, both of MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 09/482,735

(22) Filed: Jan. 13, 2000

Related U.S. Application Data

(63) Continuation-in-part of application No. 09/468,177, filed on Dec. 21, 1999, now abandoned.

(51) Int. Cl.[7] ............................ B01J 21/04; B01J 23/02
(52) U.S. Cl. ..................... 502/439; 428/402; 428/403
(58) Field of Search ............................. 502/434, 355, 502/203, 217, 208, 344, 340, 628, 325, 305; 428/402, 403, 402.24

(56) References Cited

U.S. PATENT DOCUMENTS

| | | | |
|---|---|---|---|
| 2,892,858 A | 6/1959 | Ziegler | 260/448 |
| 2,915,365 A | 12/1959 | Saussol | |
| 3,222,129 A | 12/1965 | Osment et al. | |
| 3,322,495 A | 5/1967 | Magee | |
| 3,392,125 A | 7/1968 | Kelly et al. | |
| 3,417,028 A | 12/1968 | Montgomery et al. | |
| 3,586,478 A | 6/1971 | Neumann | |
| 3,630,888 A | 12/1971 | Alpert et al. | |
| 3,773,691 A | 11/1973 | Leach | |
| 3,803,026 A | 4/1974 | Jaffe | |
| 3,839,225 A * | 10/1974 | Acres | 252/452 |
| 3,844,978 A | 10/1974 | Hickson | |
| 3,844,979 A | 10/1974 | Hickson | |
| 3,850,849 A | 11/1974 | Kiovsky et al. | |
| 3,852,190 A | 12/1974 | Buss et al. | 208/138 |
| 3,887,454 A | 6/1975 | Hickson | |
| 3,887,455 A | 6/1975 | Hamner et al. | |
| 3,892,655 A | 7/1975 | Hickson | |
| 3,898,322 A | 8/1975 | Leach | |
| 3,974,099 A | 8/1976 | Lussier et al. | |
| 3,975,510 A | 8/1976 | Leach et al. | |
| 3,987,155 A | 10/1976 | Ziegenhain | |
| 4,012,313 A | 3/1977 | Buss et al. | 208/139 |
| 4,045,331 A | 8/1977 | Ward | |
| 4,049,780 A | 9/1977 | Neumann | |
| 4,051,072 A | 9/1977 | Bedford et al. | |
| 4,069,140 A | 1/1978 | Wunderlich | |
| 4,073,718 A | 2/1978 | Hamner | |
| RE29,605 E | 4/1978 | Ziegenhain | |
| 4,097,365 A | 6/1978 | Ward | |
| 4,117,105 A | 9/1978 | Hertzenberg et al. | |
| 4,120,943 A | 10/1978 | Iwaisako et al. | |
| 4,124,699 A | 11/1978 | Michel et al. | |
| 4,159,969 A | 7/1979 | Mone et al. | |
| 4,175,118 A | 11/1979 | Wassermann et al. | |
| 4,260,524 A * | 4/1981 | Yamada et al. | 252/463 |
| 4,276,201 A | 6/1981 | Sawyer | |
| 4,301,037 A | 11/1981 | Sanchez et al. | 252/462 |
| 4,309,278 A | 1/1982 | Sawyer | |
| 4,344,928 A | 8/1982 | Dupin et al | |
| 4,375,406 A | 3/1983 | Santilli | |
| 4,392,987 A | 7/1983 | Laine et al. | |
| 4,497,909 A | 2/1985 | Itoh et al. | |
| 4,623,364 A | 11/1986 | Cottinger et al. | |
| 4,629,712 A | 12/1986 | Pinnavaia et al. | 502/63 |
| H189 H | 1/1987 | Bauer | |
| 4,637,992 A | 1/1987 | Lewis et al. | |
| 4,657,665 A | 4/1987 | Beaton et al. | |
| 4,708,945 A | 11/1987 | Murrell et al. | |
| 4,716,029 A | 12/1987 | Oguri et al. | |
| 4,760,040 A | 7/1988 | Sato et al. | 502/68 |
| 4,761,391 A | 8/1988 | Occelli | |
| 4,791,090 A | 12/1988 | Pereira et al. | |
| 4,797,139 A | 1/1989 | Bauer | |
| 4,844,790 A | 7/1989 | Occelli | |
| 4,886,594 A | 12/1989 | Miller | |
| 4,981,825 A | 1/1991 | Pinnavaia et al. | |
| 4,994,253 A | 2/1991 | Brown | |
| 4,995,964 A | 2/1991 | Gortsema et al. | |
| 5,015,614 A * | 5/1991 | Baird, Jr. et al. | 502/250 |
| 5,032,379 A | 7/1991 | Pedersen | |
| 5,063,033 A | 11/1991 | Brown | |
| 5,114,895 A | 5/1992 | Holmgren et al. | |
| 5,139,648 A * | 8/1992 | Lambert | 208/111 |
| 5,178,849 A | 1/1993 | Bauer | |
| 5,194,243 A | 3/1993 | Pearson et al. | 423/625 |
| 5,244,648 A | 9/1993 | Dupin et al. | |
| 5,266,300 A | 11/1993 | Harrison | |
| 5,338,812 A | 8/1994 | Knudsen et al. | 526/130 |
| 5,728,184 A | 3/1998 | Monroe | |

FOREIGN PATENT DOCUMENTS

| | | | |
|---|---|---|---|
| EP | 537871 | 2/1996 | C10G/11/05 |
| EP | 837118 | 4/1998 | C10G/11/05 |
| WO | WO 93/1109 | 6/1993 | |
| WO | WO 94/16996 | 8/1994 | |
| WO | WO 95/31280 | 11/1995 | |

OTHER PUBLICATIONS

U.S. application Ser. No. 09/467742, Lussier et al., filed Dec. 21, 1999.

* cited by examiner

*Primary Examiner*—Steven P. Griffin
*Assistant Examiner*—Edward Johnson
(74) *Attorney, Agent, or Firm*—Robert A. Maggio

(57) ABSTRACT

Porous composite particles are provided which comprise an aluminum oxide component, e.g., crystalline boehmite having a crystallite size of from about 20 to about 200 Angstroms and additive component residue, e.g., silicate, phosphate, of a crystal size growth inhibitor, intimately dispersed within the aluminum oxide component. The aluminum oxide component of the composite particles are derived from a mixture of alumina trihydrate (e.g., gibbsite) and an alumina seed component, i.e., active alumina, which are both converted to crystalline boehmite in the presence of the additive component. Also provided is a method for making the composite particles, agglomerate particles derived therefrom, and a process for hydroprocessing petroleum feedstock using the agglomerates.

36 Claims, No Drawings

ALUMINA TRIHYDRATE DERIVED HIGH PORE VOLUME, HIGH SURFACE AREA ALUMINUM OXIDE COMPOSITES AND METHODS OF THEIR PREPARATION AND USE

This is a continuation-in-part of U.S. patent application Ser. No. 09/468,177, filed Dec. 21, 1999 now abandoned.

FIELD OF THE INVENTION

This invention relates to high pore volume, high surface area aluminum oxide composite particles, methods of their production, agglomerates and supported catalysts derived therefrom; and methods of using said catalysts.

BACKGROUND OF THE INVENTION

The art relating to particulate porous alumina particles, shaped catalyst supports derived therefrom, supports impregnated with various catalytically active metals, metal compounds and/or promoters, and various uses of such impregnated supports as catalysts, is extensive and relatively well developed.

While the prior art shows a continuous modification and refinement of such particles, supports, and catalysts to improve their catalytic activity, and while in some cases highly desirable activities have actually been achieved, there is a continuing need in the industry for improved catalyst supports and catalysts derived therefrom, which have enhanced activity and life mediated through a desirable balance of morphological properties.

Alumina is useful for a variety of applications including catalyst supports and catalysts for chemical processes, catalyst linings for automotive mufflers, and the like. In many of these uses it will be desirable to add catalytic materials, such as metallic ions, finely-divided metals, cations, and the like, to the alumina. The level and distribution of these metals on the support, as well as the properties of the support itself are key parameters that influence the complex nature of catalytic activity and life.

Alumina useful in catalytic applications has been produced heretofore by a variety of processes, such as the water hydrolysis of aluminum alkoxides, precipitation of alumina from alumn, sodium aluminate processes, and the like. Generally speaking, while, alumina from these sources can be used for catalyst supports, such use is subject to certain limitations.

This stems from the fact that for supported catalysts used in chemical reactions, the morphological properties of the support, such as surface area, pore volume, and pore size distribution of the pores that comprise the total pore volume are very important. Such properties are instrumental in influencing the nature and concentration of active catalytic sites, the diffusion of the reactants to the active catalyst site, the diffusion of products from the active sites, and catalyst life.

In addition, the support and its dimensions also influence the mechanical strength, density and reactor packing characteristics, all of which are important in commercial applications.

Hydroprocessing catalysts in petroleum refining represent a large segment of alumina-supported catalysts in commercial use. Hydroprocessing applications span a wide range of feed types and operating conditions, but have one or more of common objectives, namely, removal of heteroatom impurities (sulfur, nitrogen, oxygen, metals), increasing the H/C ratio in the products (thereby reducing aromatics, density and/or carbon residues), and cracking carbon bonds to reduce boiling range and average molecular weight.

More particularly, the use of a series of ebullated bed reactors containing a catalyst having improved effectiveness and activity maintenance in the desulfurization and demetallation of metal-containing heavy hydrocarbon streams are well known.

As refiners increase the proportion of heavier, poorer quality crude oil in the feedstock to be processed, the need grows for processes to treat the fractions containing increasingly higher levels of metals, asphaltenes, and sulfur.

It is widely known that various organometallic compounds and asphaltenes are present in petroleum crude oils and other heavy petroleum hydrocarbon streams, such as petroleum hydrocarbon residua, hydrocarbon streams derived from tar sands, and hydrocarbon streams derived from coals. The most common metals found in such hydrocarbon streams are nickel, vanadium, and iron. Such metals are very harmful to various petroleum refining operations, such ag hydrocracking, hydrodesulfurization, and catalytic cracking. The metals and asphaltenes cause interstitial plugging of the catalyst bed and reduced catalyst life. The various metal deposits on a catalyst tend to poison or deactivate the catalyst. Moreover, the asphaltenes tend to reduce the susceptibility of the hydrocarbons to desulfurization. If a catalyst, such as a desulfurization catalyst or a fluidized cracking catalyst, is exposed to a hydrocarbon fraction that contains metals and asphaltenes, the catalyst will become deactivated rapidly and will be subject to premature replacement.

Although processes for the hydrotreating of heavy hydrocarbon streams, including but not limited to heavy crudes, reduced crudes, and petroleum hydrocarbon residua, are known, the use of fixed-bed catalytic processes to convert such feedstocks without appreciable asphaltene precipitation and reactor plugging and with effective removal of metals and other contaminants, such as sulfur compounds and nitrogen compounds, are not common because the catalysts employed have not generally been capable of maintaining activity and performance.

Thus, certain hydroconversion processes are most effectively carried out in an ebullated bed system. In an ebullated bed, preheated hydrogen and resid enter the bottom of a reactor wherein the upward flow of resid plus an internal recycle suspend the catalyst particles in the liquid phase. Recent developments involved the use of a powdered catalyst which can be suspended without the need for a liquid recycle. In this system, part of the catalyst is continuously or intermittently removed in a series of cyclones and fresh catalyst is added to maintain activity. Roughly about 1 wt. % of the catalyst inventory is replaced each day in an ebullated bed system. Thus, the overall system activity is the weighted average activity of catalyst varying from fresh to very old i.e., deactivated.

In general, it is desirable to design the catalyst for the highest surface area possible in order to provide the maximum concentration of catalytic sites and activity. However, surface area and pore diameter are inversely related within practical limits. Sufficiently large pores are required for diffusion as the catalyst ages and fouls, but large pores have a lower surface area.

More specifically, the formulator is faced with competing considerations which often dictate the balance of morphological properties sought to be imparted to supports or catalysts derived therefrom.

For example, it is recognized (see for example, U.S. Pat. No. 4,497,909) that while pores having a diameter below 60 Angstroms (within the range of what is referred to herein as the micropore region) have the effect of increasing the number of active sites of certain silica/alumina hydrogenation catalysts, these very same sites are the first ones clogged by coke thereby causing a reduction in activity. Similarly, it is further recognized that when such catalysts have more than 10% of the total pore volume occupied by pores having a pore diameter greater than 600 Angstroms (within the region referred to herein generally as the macropore region), the mechanical crush strength is lowered as is the catalyst activity. Finally, it is recognized, for certain silica/alumina catalysts, that maximization of pores having a pore diameter between 150 and 600 Angstroms (approximately within the region referred to herein as the mesopore region) is desirable for acceptable activity and catalyst life.

Thus, while increasing the surface area of the catalyst will increase the number of the active sites, such surface area increase naturally results in an increase of the proportion of pores in the micropore region. As indicated above, micropores are easily clogged by coke. In short, increases in surface area and maximization of mesopores are antagonistic properties.

Moreover, not only must the surface area be high, but it should also remain stable when exposed to conversion conditions such as high temperature and moisture. There has therefore been a continuing search for high pore volume, high surface area, hydrothermally stable alumina suitable for catalyst supports.

One response to this search is provided in related and commonly assigned U.S. patent application Ser. No. 09/467,742, filed Dec. 21, 1999, abandoned. In this patent application, composite particles containing boehmite and a swellable clay are described. Such composite particles employ active alumina as the starting aluminum oxide which is rehydrated and converted to boehmite in the presence of a swellable clay. While this process and the product produced thereby has many advantages, active alumina is a relatively expensive starting material. Active alumina may be derived from the flash calcination of gibbsite. Consequently, it would be even more advantageous if one could directly make high pore volume, high surface area boehmite using gibbsite as a primary starting material. One impediment to accomplishing this goal is the tendency of gibbsite to form large crystallites (e.g., about 500 Angstroms) during its transition into boehmite. Large crystallites result in a low pore volume product at desired surface areas.

Thus, the search has continued for ways to not only produce pore volume high surface area boehmite products but also to accomplish the same in a cost efficient manner. The present invention was developed in response to this search.

U.S. Pat. No. 5,728,184 is directed to a method for making polycrystalline alpha alumina-based ceramic materials by forming a dispersion of boehmite and a silica source, hydrothermally treating the dispersion, converting the dispersion to an alpha alumina-based ceramic precursor material and sintering the precursor. Optionally, a nucleating material (sometimes referred to as a seed material) can be employed to reduce the size of the alpha alumina crystallites and enhance the density and hardness of the resultant ceramic material. Disclosed nucleating materials include alpha-$Al_2O_3$ and alpha-$Fe_2O_3$. At column 3, lines 25 et seq., a "nucleating material" is described as referring to a material that enhances the transformation of transitional aluminas to alpha alumina. Thus, this patent starts with boehmite and converts the boehmite to alpha alumina. In contrast, the presently claimed invention relies on a mixture of alumina trihydrate, alumina seed component, e.g., activated alumina, and crystal size growth inhibitor (also referred to herein as CSGI), to form boehmite having certain morphological and crystallographic properties which typically is converted to gamma alumina upon calcination. Moreover, this patent discusses nothing about the pore properties of the resulting product.

U.S. Pat. No. 4,797,139 discloses a method for making microcrystalline boehmite gel by the hydrothermal treatment of gibbsite in the presence of boehmite seeding agents at temperatures less than 200° C. and pressures less than 200 psi. The conversion of gibbsite to microcrystalline boehmite is said to be retarded by additives such as phosphates or fluorides and that such additives are to be avoided (col. 2, lines 53 et seq.). The process is conducted at a pH of about 5 or lower, or alternatively, at a pH of 8 or higher. To form the desired microcrystalline boehmite, the seeding agent should be less than 200 Å in size at amounts of at least 7.5 wt. % based on the boehmite precursor. If, however, it is desired to maximize surface area, and the boehmite is to be used in making porous gamma alumina for catalytic applications, the boehmite seeds utilized are less than 100 Å and preferably less than 50 Å (column 3, lines 34 et seq.). In addition, where the microcrystalline boehmite product is ultimately used to make alpha alumina ceramic bodies, submicron alpha alumina seeds for facilitating uniformity of the conversion of the microcrystalline boehmite to the alpha alumina are desirably mixed with the gibbsite starting material during autoclaving (col. 3, lines 51 et seq.). Various additives can be mixed with the boehmite after autoclaving or with the boehmite precursor prior to autoclaving, such as magnesium oxide, which functions as a crystal growth inhibitor. (Column 7, lines 47 et seq.) In contrast, the presently claimed invention relies on an average particle size of all the solid components in the dispersion which is eventually autoclaved of typically from about 0.1 to about 15 microns (i.e., 1,000 to about 150,000 Å) to make high surface area and high pore volume boehmite composites which is typically converted to gamma alumina upon calcination.

U.S. Pat. No. 4,623,364 discloses aluminous abrasives produced from alumina gels which form alpha alumina particles of submicron size (0.2 to 0.4 micrometers). The abrasives are made by vibratory milling of the gel with alumina bodies. It is hypothesized that the milling introduces material from the alumina grinding media into the alumina gel which effects seeding of the crystallization of alpha alumina during the firing (col. 5, lines 55 et seq.). Disclosed milling media contained about 90 wt. % alpha alumina containing $SiO_2$, MgO and $Fe_2O_3$ impurities. Various additives may also be added to the alumina before or after gelling such as about 5 wt. % MgO. The MgO is present in the product, however, as spinel (magnesium aluminate: $MgAl_2O_4$) which surrounds the unreacted alpha alumina (col. 6, lines 60). Grain growth inhibitors such as $SiO_2$, $Cr_2O_3$, MgO and $ZrO_2$ may be added to the conditioned gel. The goal of this patent appears to be to make alpha alumina by transforming gamma alumina of the gel alumina to alpha alumina at lower temperatures, e.g., 1090° C. in the presence of seeds versus 1190° C. in the absence of seeds (col. 6, lines 40 et seq.).

In contrast, the goal of the present invention is to make boehmite, not alpha alumina, through the use of active alumina seeds in combination with at least one CSGI.

U.S. Pat. No. 4,069,140 discloses a carrier material having a high pore volume of at least 0.8 cm$^3$/g with a major portion of the pore volume having a mean effective pore radius of greater than 100 Å and feeder pores having a radii greater than 1000 Å. Suitable carriers disclosed at column 6, lines 55 et seq., include alumina that contains both boehmite and amorphous hydrous alumina. At column 7, lines 15 et seq., it is further disclosed that the carrier can contain various fillers including alumina, silica, amorphous silica-alumina, crystalline aluminosilicate, carbon, starch and cellulose fibers and mixtures thereof. The patent fails to describe the crystallite size of the boehmite and does not appear to describe the combined use of gibbsite and active alumina (or boehmite) seeds to form the claimed boehmite product.

U.S. Pat. No. 4,097,365 discloses heterogeneous composites of a silica-alumina cogel dispersed in a matrix consisting essentially of alumina gel. It is alleged that the silica is heterogeneously dispersed in the alumina base in the form of a silica-rich, silica-alumina cogel or graft copolymer, and that the alumina base provides a matrix in which the finely divided silica-alumina composite is dispersed. The heterogeneously dispersed silica-rich silica-alumina cogel is differentiated from a homogeneous cogel. It will be observed that the silicate crystal size growth inhibitors employed in the presently claimed invention are not silica-alumina cogels.

U.S. Pat. No. 5,178,849 discloses a process for the production of a colloidal boehmite by providing a slurry of an alumina hydrate having a low dispersability, acidifying the slurry to a pH of about 3.5 or lower to partially dissolve the alumina hydrate, but not enough to completely dissolve the same, and then digesting the acidified mixture at a temperature of about 150 to 200° C. under a pressure of about 5 to 20 atmospheres (e.g., autoclaving) to produce the colloidal boehmite. Rather than starting with boehmite, alumina trihydrate (gibbsite) may be employed as a starting material (col. 2, line 27). Grain growth inhibitors, such as silica, may be added. Seed materials may be added to boehmite to enhance the conversion of the boehmite to alpha alumina or to alumina trihydrate (boehmite precursor) to promote boehmite formation from the boehmite precursor. The seed material can be added before or after the hydrothermal treatment. Seed materials typically will possess a particle size of below 1 micron (col. 3, line 55). Seed materials for conversion of boehmite to alpha alumina include submicron alpha alumina, as well as ferric oxide (col. 3, line 42). Seed materials for conversion of the boehmite precursor to boehmite include submicron boehmite (col. 3, lines 46 et seq.). The method of the presently claimed invention does not employ acid digestion of the type described in the subject patent nor does it make colloidal boehmite. This patent fails to disclose the combination of active alumina and gibbsite, which are converted to crystalline boehmite having a specifically defined crystallite size in the presence of a crystal growth inhibitor, such as a silicate, phosphate or sulfate.

U.S. Pat. No. 5,114,895 discloses a composition of a layered clay homogeneously dispersed in an inorganic oxide matrix such that the clay layers are completely surrounded by the inorganic oxide matrix. The inorganic oxide matrix is selected from alumina, titania, silica, zirconia, P$_2$O$_5$ and mixtures. Suitable clays include bentonite, sepiolite, Laponite™, vermiculite, montmorillonite, kaolin, palygorskite (attapulgus), hectorite, chlorite, beidellite, saponite, and nontronite. To get the clay homogeneously dispersed within the inorganic oxide matrix, a precursor of the inorganic oxide is dispersed as a sol or hydrosol and gelled in the presence of the clay. While clay contents of 5 to 70 wt. % are disclosed broadly, the Examples employ at least 30 wt. % clay. In addition, none of the pore properties or the resulting product are disclosed.

Statutory Invention Registration No. H-189 summarizes various ways of making boehmite. More specifically, gibbsite is digested with an acid such as nitric acid and the resultant material neutralized with base and the resultant gelatinous mass then allowed to age and dehydrate for several hours at temperatures about 80° C. Alpha alumina seeds may be added either before, during or after hydrolysis without any differences in the final product. In contrast, active alumina typically exists in chi and rho forms.

U.S. Pat. No. 3,392,125 is directed to the preparation of alpha alumina by partially calcining, i.e., flash calcining alumina trihydrate (gibbsite) at greater than 800° C. to make chi and rho forms, also referred to as active alumina. The active alumina is then rehydrated and a major portion thereof is converted to the alumina phase of boehmite, pseudo boehmite, or mixtures and then calcined at greater 1000° C. Additional patents which disclose the formation of boehmite from gibbsite include U.S. Pat. Nos. 4,117,105; 4,344,928; 4,716,029; 4,994,253; and 5,063,033.

U.S. Pat. No. 4,276,201 discloses a catalyst support comprising agglomerates of alumina and 10% or less of silica. Optionally, minor amounts of other refractory oxides may be included in the support. The alumina agglomerates are prepared by contacting hydrous aluminum oxide gel with an organic liquid which is essentially immiscible with water at a given ratio of organic liquid to water, as contained in the gel, such that only a portion of the water is removed from the hydrous aluminum oxide gel, prior to drying the gel. A number of techniques can thereafter be applied to accomplish agglomerations such as placing the gel in a rotary film evaporator and evaporating the liquid phase with continuous agitation. The agglomerated alumina is then calcined.

U.S. Pat. No. 4,886,594 discloses a hydrotreating catalyst composition comprising a hydrogenating component consisting essentially of a metal component in which the metal is selected from Group VIB and a phosphorous component, deposited on the surface of a support comprising a porous refractory inorganic oxide and free of zeolite.

U.S. Pat. No. 4,981,825 is directed to compositions of inorganic metal oxide (e.g., SiO$_2$) and clay particles wherein the oxide particles are substantially segregated from each other by the clay particles. Suitable clays include Laponite™. The disclosed ratio of metal oxide:clay is between 1:1 to 20:1 (preferably 4:1 to 10:1). The subject composition is derived from an inorganic oxide sol having a particle size of 40 to 800 Angstroms (0.004 to 0.08 microns). The particle size of the final product is dependent on the size of the particles in the starting sol, although the final particle size is unreported. It is critical that the metal oxide and clay particles have opposite charges so that they will be attracted to each other such that the clay particles inhibit aggregation of the metal oxide particles. Thus, the clay particles are described as being placed between the sol particles. Control of the charges on the two different types of particles is determined by the pH of the sol. The pH of the inorganic oxide is controlled to be below its isoelectric point by acid addition thereby inducing a negative charge on the inorganic oxide particles. While suitable inorganic metal oxides are disclosed to also include Al$_2$O$_3$, no examples of carrying out the invention using Al$_2$O$_3$ are provided. Consequently, translating this concept to Al$_2$O$_3$ is not without difficulty. For example, the isoelectric point of $Al_2O_3$ is at a basic pH of about 9. However, $Al_2O_3$ sols only form at a low pH of less than about 5. If the pH exceeds about 5, an $Al_2O_3$ sol will precipitate from dispersion or never form in the first place. In contrast, $SiO_2$ sols do not have to be acidic. Consequently, while any point below the isoelectric point is acceptable for $SiO_2$ sols, the same is not true of $Al_2O_3$ sols. Rather, one must operate at a pH well below the isoelectric point of the $Al_2O_3$ in the pH region where alumina sols form. Moreover, this patent discloses nothing about the crystallite size or pore properties of the resulting composite and its thrust is only directed toward obtaining high surface area. As indicated above, surface area and high pore volume are antagonistic properties.

In contrast, the presently claimed invention neither starts with an $Al_2O_3$ sol (from which little or no boehmite would form) nor forms a sol during hydrothermal treatment. The pH at which the presently claimed composites are formed is too high for a sol to form during hydrothermal treatment and the starting alumina particles are too big for a sol to form initially.

Another area of technology relating to combinations of various clay and metal oxides is known as intercalated clays. Intercalated clays are represented by U.S. Pat. Nos. 3,803,026; 3,887,454 (See also U.S. Pat. No. 3,844,978); U.S. Pat. No. 3,892,655 (See also U.S. Pat. No. 3,844,979); U.S. Pat. Nos. 4,637,992; 4,761,391 (See also U.S. Pat. No. 4,844,790); and U.S. Pat. No. 4,995,964. Intercalated clays or patents describing the same typically have in common the requirement that large clay:sol ratios be employed and at least some small (<25 Å) pores be formed.

U.S. Pat. No. 3,803,026 discloses a hydrogel or hydrogel slurry comprising water, a fluorine-containing component, and an amorphous cogel comprising oxides or hydroxides of silicon and aluminum. The amorphous cogel further comprises an oxide or hydroxide of at least one element selected from magnesium, zinc, boron, tin, titanium, zirconium, hafnium, thorium, lanthanum, cerium, praseodymium, neodymium, and phosphorus, said amorphous cogel being present in the hydrogel or hydrogel slurry at an amount of from 5 to 50 wt. %. The slurry is subjected to a pH of 6 to 10 and conversion conditions create a substantial amount of crystalline aluminosilicate mineral, preferably in intimate admixture with a substantial amount of unreacted amorphous cogel. The silica/alumina molar ratio is at least 3:1 and the resulting material is referred to as a synthetic layered crystalline clay-type aluminosilicate mineral. At column 5, lines 39 et seq., it is disclosed that the resulting aluminosilicate can be broken into particles, pulverized into a powder, the powder dispersed in a hydrogel, or hydrogel slurry to which is added components selected from precursor compounds of, inter-alia, alumina. The resulting mixture is then dried and activated. Notwithstanding the above disclosure, no specific examples employing a mixture of silica-aluminate with alumina is disclosed. Consequently, neither the starting alumina, the final alumina, nor the amounts employed of each material are disclosed.

U.S. Pat. No. 3,887,454 (and its parent U.S. Pat. No. 3,844,978) discloses a layered type dioctahedral, clay-like mineral (LDCM) composed of silica, alumina, and having magnesia incorporated into its structure in controlled amounts. Preferred clays are montmorillonite and kaolin. At column 6, lines 24 et seq., it is disclosed that the clay material can be combined generally with inorganic oxide components such as, inter-alia, amorphous alumina. In contrast, the presently claimed composite utilizes crystalline boehmite alumina. Similar disclosures are found in U.S. Pat. Nos. 3,892,655; and 3,844,979, except that these latter patents are directed to layer-type, trioctahedral, clay-like mineral containing magnesia as a component thereof (LTCM) and illustrated with a saponite type clay.

U.S. Pat. No. 4,637,992 is an intercalated clay patent which employs colloidal suspension of inorganic oxides and adds a swellable clay thereto. While specific ranges illustrating the ratio of clay to inorganic oxide are not disclosed, it appears that the final material is still referred to as being a clay based substrate into which is incorporated the inorganic oxide. Consequently, this suggests that the final material contains a major amount of clay rather than a predominate amount of aluminum oxide and very minor amounts of clay as in the present invention. See for example, column 5, lines 46 et seq., of the '992 patent.

U.S. Pat. No. 4,844,790 (division of U.S. Pat. No. 4,761,391) is directed to a delaminated clay prepared by reacting a swellable clay with a pillaring agent which includes alumina. The ratio of clay to pillaring agent is .01:1 to 10:1, preferably between 1:1 to 2:1. The primary thrust of the patent, however, is clay containing alumina and not alumina containing less than 10 wt. % clay. It is reasoned that the metal oxides prop apart the platelets of the clay and imparting acidity thereto which is responsible for the catalytic activity of the delaminated clay. The preferred clay is a Laponite™.

U.S. Pat. No. 4,995,964, is directed to a product prepared by intercalating expandable clay (hectorite, saponite, montmorillonite) with oligimers derived from rare earth salts, and in particular, trivalent rare earths, and polyvalent cations of pillaring metals, such as $Al^{+3}$. The aluminum oxide material is an aluminum containing oligimer which is used in providing the pillars of the expanded clays. The claimed invention does no use or produce oligimers of aluminum hydroxy materials.

U.S. Pat. No. 4,375,406 discloses compositions containing fibrous clays and precalcined oxides prepared by forming a fluid suspension of the clay with the precalcined oxide, agitating the suspension to form a codispersion, and shaping and drying the codispersion. The ratio of fibrous formed clay to precalcined oxide composition can vary from 20:1 to 1:5. These amounts are well above the amounts of clay employed in the presently claimed invention. Moreover, fibrous clay such as sepiolite or attapulgite are not within the scope of the swellable clays described herein.

A number of patents are directed to various types of alumina and methods of making the same, namely, U.S. Pat. No. Re 29,605; SIR H198; and U.S. Pat. Nos. 3,322,495; 3,417,028; 3,773,691; 3,850,849; 3,898,322; 3,974,099; 3,987,155; 4,045,331; 4,069,140,, 4,073,718, 4,120,943; 4,175,118; 4,708,945; 5,032,379; and 5,266,300.

More specifically, U.S. Pat. No. 3,974,099 is directed to silica/alumina hydrogels from sodium silicate and sodium aluminate cogels. The essence of this invention is directed to the precipitation of $Al_2O_3$ onto silica-alumina gel which stabilizes the cracking sites to hydrothermal deactivation. (Column 2, lines 43 et seq.) The resulting material typically has about 38.6% alumina oxide when all the excess sodium aluminate is removed.

U.S. Pat. No. 4,073,718 discloses a catalyst base of alumina stabilized with silica on which is deposited a cobalt or nickel catalyst.

U.S. Pat. No. 4,708,945 discloses a cracking catalyst of silica supported on boehmite-like surface by compositing particles of porous boehmite and treating them with steam at greater than 500° C. to cause silica to react with the boehmite. 10% silica is usually used to achieve a surface monolayer of silica to improve thermal stability.

U.S. Pat. No. 5,032,379 is directed to alumina having greater than 0.4 cc/g pore volume and a pore diameter in the range of 30 to 200 Å. The alumina is prepared by mixing two different types of rehydration bondable aluminas to produce a product having a bimodal pore distribution.

U.S. Pat. No. 4,266,300 discloses an alumina support prepared by mixing at least two finely divided aluminas, each of which is characterized by at least one pore mode in at least one of the ranges (i) 100,000 to 10,000 Å, (ii) 10,000 to 1,000 Å, (iii) 1,000 to 30 Å.

U.S. Pat. No. 4,791,090 discloses a catalyst support with a bi-dispersed micropore size distribution. Column 4, lines 65, discloses that two sizes of micropores can be formulated by mixing completely different materials having different pore sizes such as alumina and silica.

U.S. Pat. No. 4,497,909 is directed to silica/alumina carriers having a silica content less than about 40% by weight and at least one noble metal component of Group VII of the Periodic Table and wherein the catalyst contains pores having a diameter smaller than 600 Å occupying at least 90% of the total pore volume, and pores having a diameter of 150 to 600 Å occupying at least about 40% of the total pore volume made up of pores having a diameter smaller than 600 Å.

U.S. Pat. No. 4,159,969 discloses a process for the manufacture of agglomerates of aluminum oxide by contacting a hydrous aluminum oxide gel with an organic liquid immiscible with water wherein the amount of said liquid is a function of the water in the hydrous aluminum oxide gel. An amount of clay, such as bentonite or kaolin, sufficient to increase the strength of the agglomerates may be added to the aluminum oxide during or after gelation. No specific amount of clay is disclosed and kaolin is not a swellable clay. None of the examples employ clay.

The following patents disclose various types of clays: U.S. Pat. Nos. 3,586,478; 4,049,780; 4,629,712; and PCT Publication Nos. WO 93/11069; and WO 94/16996.

The following patents disclose various types of agglomerates which can be formed from alumina: U.S. Pat. Nos. 3,392,125; 3,630,888; 3,975,510; 4,124,699; 4,276,201 (see also U.S. Pat. No. 4,309,278); U.S. Pat. Nos. 4,392,987; and 5,244,648.

U.S. Pat. No. 3,630,888 discloses a catalyst having a structure in which access channels having diameters between about 100 and 1000 Å units constitute 10 to 40% of the total pore volume and in which access channels having diameters greater than 1000 Å units constitute between about 10 to about 40% of the total pore volume, while the remainder of the pore volume comprises 20 to 80% of micropores with diameters less than 100 Å.

The following patents disclose various hydroprocessing operations and use of catalysts therein: U.S. Pat. Nos. 3,887,455; 4,657,665; 4,886,594; PCT Publication No. WO 95/31280.

SUMMARY OF THE INVENTION

The present invention is based on the discovery that when alumina trihydrate is dispersed and hydrothermally treated in the presence of controlled amounts of a dispersed active alumina seed component and at least one crystal size growth inhibitor additive component, the resulting boehmite containing composite particles exhibit a small crystallite size which induces a high surface area while simultaneously possessing a higher pore volume relative to the absence of the seed and additive components. These properties are substantially preserved in agglomerates, e.g., shaped extrudates, derived from the composite particles before and after impregnation with catalytically active metal components such as those employed for hydroprocessing operation,. Preparation of the alumina in a high pore volume, high average pore diameter form makes calcination before addition of metals to increase the average pore diameter unnecessary. It also renders unnecessary the use of organic solvents to azeotropically remove water which is both costly and environmentally unfriendly.

Accordingly, in one aspect of the present invention there is provided porous composite particles comprising an aluminum oxide component and at least one additive component residue of a crystal size growth inhibitor intimately dispersed within the aluminum oxide component, wherein said composite particles (after calcining at 537.8° C. for 2 hours) have:

(A) a specific surface area of at least about 80 $m^2/g$;

(B) an average nitrogen pore diameter of from about 60 to 1,000 Angstroms;

(C) a total nitrogen pore volume of from about 0.2 to about 2.5 cc/g; and (D) an average particle diameter of from about 1 to about 15 microns.

and wherein in said composite particles:

(i) the alumina oxide component comprises at least 70 wt. % (a) crystalline boehmite having an average crystallite size of from about 20 to about 200 Angstroms; (b) gamma alumina derived from said crystalline boehmite; or (c) mixtures thereof;

(ii) the additive component residue is derived from at least one ionic compound having a cation and an anion wherein the cation is selected from the group consisting of ammonium, alkali metal cation, alkaline earth metal cation and mixtures thereof and the anion is selected from the group of hydroxyl, silicate, phosphate, sulfate and mixtures thereof, and is present in the composite particles at an amount of from about 0.5 to about 10 wt. %, based on the combined weight of the aluminum oxide component, and additive component.

In a further aspect of the present invention, there is provided a process for making porous composite particles comprising:

(A) admixing (i) alumina trihydrate, (ii) liquid medium capable of solubilizing at least a portion of the alumina trihydrate under the hydrothermal treatment conditions of step B, (iii) at least one active alumina seed component, and (iv) at least one additive component selected from the group of (a) at least one alkali or alkaline earth metal or ammonium: hydroxide, silicate, phosphate or sulfate, (b) swellable clay and mixtures thereof, in a manner and under conditions sufficient to disperse the alumina trihydrate and alumina seed component as particles in the liquid medium;

(B) hydrothermally treating a dispersion provided in accordance with step A at a temperature and for a time sufficient to convert the active alumina and alumina trihydrate to crystalline boehmite having an average crystallite size of from about 20 to about 200 Angstroms and to form composite particles comprising residue of said additive component intimately dispersed within said crystalline boehmite slurried in the liquid medium;

(C) removing the liquid medium from the composite particles provided in accordance with step B.

In a further aspect of the present invention, there is provided supported catalysts derived from the above agglomerates.

In a still further aspect of the present invention, there is provided a process for hydroprocessing petroleum feedstock using the above agglomerates as supports for hydroprocessing catalysts.

DESCRIPTION OF PREFERRED EMBODIMENTS

The term "micropore" as used herein means pores having a diameter of less than 100 Angstroms.

The term "mesopore" as used herein means pores having a diameter between 100 and 500 Angstroms.

The term "macropore," as used herein means pores having a diameter greater than 500 Angstroms.

The term "pore mode" as used herein means the pore diameter corresponding to the peak maximum where the log differential nitrogen or mercury intrusion in cc/g, is plotted as a function of the differential of the pore diameter.

The term "total pore volume" as used herein means the cumulative volume in cc/g of all pores discernable by either nitrogen desorption or mercury penetration methods. More specifically, for alumina particles which have not been agglomerated (e.g., by extrusion) the pore diameter distribution and pore volume is calculated with reference to the nitrogen desorption isotherm (assuming cylindrical pores) by the B.E.T. technique as described by S. Brunauer, P. Emmett, and E. Teller in the Journal of American Chemical Society, 60, pp 209–31.9 (1939).

In respect to alumina particles which have been agglomerated, e.g., formed into extrudates, the pore diameter distribution is calculated by means of the formula:

$$\text{pore diameter (in Angstroms)} = \frac{150{,}000}{\text{absolute mercury pressure (in bar)}}$$

and in accordance with the mercury penetration method (as described by H. L. Ritter and L. C. Drake in Industrial and Engineering Chemistry, Analytical Edition 17, 787 (1945)), using mercury pressures of 1–2000 bar. Mercury penetration is the technique of choice when the quantity of pores <60 Å in diameter is small as is the case in agglomerates.

The total $N_2$ pore volume of a sample is the sum of the nitrogen pore volumes as determined by the above described nitrogen desorption method. Similarly, the total mercury pore volume of a sample is the sum of the mercury pore volumes as determined by the mercury penetration method described above using a contact angle of 130°, a surface tension of 485 dynes /cm and a Hg density of 13.5335 gm/cc.

The term "surface area" refers herein to the specific surface area determined by nitrogen adsorption using the B.E.T. technique as described above, whether in powder or agglomerate form.

All fresh surface areas and pore measurements (e.g., pore volume and pore size) are determined on samples which have been dried (at 142° C.), cation exchanged and dried at 142° C. if an exchange step is employed, and then calcined at 537.8° C. (1,000° F.) for 2 hours.

All particle size and particle size distribution measurements described herein are determined by a Mastersizer unit from Malvern, which operates on the principle of laser light diffraction and is known to all familiar in the art of small particle analysis.

All morphological properties involving weight, such as pore volume (cc/g) or surface area (m²/g) are to be normalized to a Metals Free Basis.

Samples are normalized herein to a metals free basis in accordance with the following Equation:

$$MFB = \frac{(X)(100)}{(100 - W)} \qquad \text{(Equation 1)}$$

wherein

X is this pertinent pore property such as PV (in cc/g), or SA (m²/g)

W=the wt. % of catalytic promoter metal oxides such as Ni, Co and Mo oxide on the catalyst based on the wt. of porous constituents of the catalyst. The weight of non-porous constituents, e.g., non-porous, diluents, of the catalyst extrudate are not included in the wt. % calculation and MFB=Metals Free Basis.

As indicated above, the present invention is directed to boehmite composite particles derived from hydrothermally treating an admixture of alumina seed component, alumina trihydrate and at least one crystal size growth inhibitor additive component.

The alumina seed component is active alumina which can be prepared by a variety of methods. For example, alumina trihydrate precipitated in the Bayer process may be ground and flash calcined. Active alumina, as referred to herein, is characterized as having a poorly crystalline and/or amorphous structure.

The expression "alumina of poorly crystalline structure" for the purposes of the aforegoing process is understood as meaning an alumina which is such that X-ray analysis gives a pattern which shows only one or a few diffuse lines corresponding to the crystalline phases of the low-temperature transition aluminas, and contains essentially the chi, rho, eta, gamma and pseudo-gamma phases and mixtures thereof.

By the expression "alumina of amorphous structure" is meant an alumina which is such that its X-ray analysis does not give any line characteristic of a highly (predominantly) crystalline phase.

Active alumina employed herein can be generally obtained by the rapid dehydration of aluminum hydroxides such as bayerite, hydrargillite or gibbsite, and nordstrandite, or of aluminum oxyhydroxides such as boehmite and diaspore. The dehydration can be carried out in any appropriate apparatus, and by using a hot gaseous stream. The temperature at which the gases enter the apparatus can generally vary from about 400° to 1,200° C. and the contact time of the hydroxide or oxyhydroxide with the hot gases is generally between a fraction of a second and 4 to 5 seconds.

The resulting product may contain minor, e.g., trace, amounts of boehmite, chi, gamma, alpha, and other crystalline alumina structures as well as residual gibbsite.

The resulting active alumina will typically exhibit a weight loss when heated to 538° C. for 1 hour of from about 4 to 12 wt. %.

The specific surface area of the active alumina obtained by the rapid dehydration of hydroxides or oxyhydroxides, as measured by the conventional B.E.T method, generally varies between about 50 and 400 m²/g, and the diameter of the particles is generally between 0.1 and 300 microns and preferably between 1 and 120 microns with an average particle size of typically greater than 1 micron, preferably between about 5 and about 20, most preferably between about 5 and about 15 microns. The loss on ignition, measured by calcination at 1,000° C., generally varies between 3 and 15%, which corresponds to a molar ratio $H_2O/Al_2O_3$ of between about 0.17 and 0.85.

In a preferred embodiment, an active alumina originating from the rapid dehydration of Bayer hydrate (hydrargillite), which is a readily available and inexpensive industrial aluminum hydroxide is employed. Active alumina of this type is well known to those skilled in the art and the process for its preparation has been described, for example, in U.S. Pat. Nos. 2,915,365; 3,222,129 and preferably U.S. Pat. No. 4,051,072, column 3, line 6, to column 4, line 7, the disclosures of which patents are incorporated herein by reference.

The active alumina employed can be used as such or may be treated so that its sodium hydroxide content, expressed as $Na_2O$, is less than 1,000 ppm.

Suitable active alumina powder starting material is commercially available from the Aluminum Company of America under grade designations CP-3, CP-2, -CP-1, CP5, CP-7, or CP-100. It is also available from Porocel (Little Rock, Ark.) under the designation AP-15.

A primary source of boehmite in the final product is alumina trihydrate. Any of the forms of alumina trihydrate are suitable, although gibbsite, the alpha form thereof, is preferred.

The additive component which is admixed with the active alumina and alumina trihydrate components function as a crystal size growth inhibitor during hydrothermal treatment. Without wishing to be bound by any particular theory it is believed in that the active alumina forms extremely small seeds of boehmite upon rehydration under the influence of the crystal size growth inhibitor. At the same time, the alumina trihydrate is believed to be partially soluble in the liquid medium and an equilibrium is believed to exist, under hydrothermal treatment conditions, between the dissolved alumina trihydrate and suspended insoluble alumina trihydrate. Thus, it is further believed that the small crystallite size boehmite derived from the active alumina serve as small seeds onto the surface of which crystallizes boehmite from the dissolved aluminum trihydrate. Large crystallites in the boehmite tend to produce a low pore volume product at surface areas of from about 80 to about 200 m²/g. It has been found that certain crystal size growth inhibitors work in combination with active alumina under certain conditions to reduce the size of the ultimate boehmite crystallites.

Suitable crystal size growth inhibitor additive components are selected from the group consisting of alkali and alkaline earth metal or ammonium, hydroxides, silicates, phosphates, and sulfates, as well as the swellable clays.

Representative examples of alkali metal or alkaline earth metals suitable for use in the crystal size growth inhibitor include, lithium, sodium, potassium, cesium, magnesium, calcium, strontium, and barium. Among the alkali metals and alkaline earth metals mentioned above, lithium, sodium, potassium, magnesium, and calcium are preferred. The most preferred metal is sodium.

Representative examples of suitable alkali or alkaline earth metal hydroxides include sodium hydroxide, potassium hydroxide, calcium hydroxide, lithium hydroxide, and magnesium hydroxide.

Representative examples of suitable alkali or alkaline earth metal silicate crystal growth inhibitor additive components include the mono-, di-, tri- and tetra alkali metal silicates, including sodium silicate, potassium silicate, magnesium silicate, sodium orthosilicate ($Na_4SiO_4$), sodium metasilicate ($Na_2SiO_3$), potassium metasilicate and water glass (which is a liquid mixture of various sodium silicates).

Representative examples of suitable alkali or alkaline earth metal phosphate crystal size growth inhibitor additive components include disodium hydrogen phosphate, dipotassium hydrogen phosphate, trisodium phosphate, dicalcium orthophosphate, tricalcium phosphate, calcium polymetaphosphate, and sodium polymetaphosphate. The preferred phosphates are the poly phosphate salts, such as the pyrophates and tripolyphosphates, including the dialkali metal pyrophosphate salts, and tetra alkali metal pyrophosphate salts, and mixtures thereof, such for example as disodium dihydrogen pyrophosphate ($Na_2H_2P_2O_7$), tetrasodium pyrophosphate ($Na_4P_2O_7$), and tetrapotassium pyrophosphate ($K_4P_2O_7$), sodium trihydrogen pyrophosphate, trisodium hydrogen pyrophosphate, and mixtures thereof. Preferred pyrophosphate salts include sodium trihydrogen pyrophosphate, disodium dihydrogen pyrophosphate., tetrasodium pyrophosphate, tetrapotassium pyrophosphate and mixtures thereof. The most preferred phosphate salt is tetrasodium pyrophosphate.

Ammonium salts of any of the above-mentioned anions can also be employed.

Representative examples of suitable alkali or alkaline earth metal sulfate crystal growth inhibitor additive components include magnesium sulfate, potassium sulfate, sodium sulfate, lithium sulfate, and mixtures thereof.

The swellable clay crystal size growth inhibitor comprises any natural or synthetic member of the 2:1 clay:mineral layered silicate clays capable of undergoing swelling and dispersion and mixtures thereof Swelling clays are expandable clays whose platelets are held together by weak van der Waal's forces. Natural swelling clays (contrary to synthetic swelling clays) typically have a particular shape or morphologysuch that they exhibit a length-to-width ratio of typically greater than about 2.0, preferably greater than about 5.0, and length-to-thickness ratio greater than about 5.0, preferably greater than about 7.0. In general, typically more than about 20%, preferably more than about 40%, and most preferably more than about 50%, of the particles of the natural clay will have the above-discussed length-to-width and length-to-thickness ratios. In determining these ratios for odd shaped particles, the length is the straight line distance between the two points on the particles which are the furthest apart while the width is the straight line distance between the two points that are the closest together. Such clays include the smectite class of clays as well as the ion exchanged (e.g., $Na^+$, $Li^+$) derivatives thereof. In general, alkali metal exchange forms are preferred because of their enhanced ability to swell and disperse. Also, dispersible 2:1 layered silicates such as vermiculite, tetrasilicic mica and taeniolite are useful. Synthetic clays such as Laponite™ can exhibit a more spherical shape.

More specifically, smectite are 2:1 clay mineral that carry a lattice charge and characteristically expand when solvated with water and alcohols, most notably ethylene glycol and glycerol. These minerals comprise layers represented by the general formula:

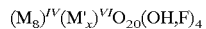

$(M_8)^{IV}(M'_x)^{VI}O_{20}(OH,F)_4$ wherein IV indicates an ion coordinated to four other ions, VI indicates an ion coordinated to six other ions and x may be 4 or 6. M is commonly $Si^{4+}$, $Al^{3+}$ and/or $Fe^{3+}$, but also includes several other four coordinate ions such as $P^{5+}$, $B^{3+}$, $Ge^{4+}$, $Be^{2+}$, and the like. M' is commonly $Al_{3+}$ or $Mg^{2+}$, but also includes many possible hexacoordinated ions such as $Fe^{3+}$, $Fe^{2+}$, $Ni^{2+}$, $Co^{2+}$, $Li^+$, and the like. The charge deficiencies created by the various substitutions into these four and six coordinate cation positions are balanced by one or several cations located between the structural units. Water may also be occluded between these structural units bonded either to the structure itself, or to the cations as a hydration shell. When dehydrated (dehydroxylated), the above structural units have a repeat distance of about 9 to 12 Angstroms, as measured by X-ray diffraction. Commercially available natural smectites include montmorillonite (bentonite), beidellite, hectorite, saponite, sauconite and nontronite. Also commercially available are synthetic smectites such as Laponite™, a synthetic hectorite available from Laporte Industries Limited.

Smectites are classified into two categories, dioctahedral and trioctahedral, the difference being the number of octahedral sites in the central layer which are occupied. This, in turn, is related to the valency of the cation in the central layers.

The dioctahedral smectites have central cations which are trivalent and substituents which are divalent, whereas trioctahedral smectites have divalent central cations with monovalent substituents. Dioctahedral smectites include montmorillonite, beidellite and nontronite wherein, for example, montmorillonite has as the octahedral cation (M'), aluminum, with magnesium as the substituent. Trioctahedral smectites, which are preferred, include hectorite and saponite and their synthetic forms wherein, for example, hectorite has as the octahedral cation (M'), magnesium, with lithium as the substituent.

The smectite most advantageously used as the crystal size growth inhibitor is trioctahedral smectite clay having a lath-shape or spherical-shape morphology. However, trioctahedral smectites of platety-shape or mixed lath-shape and platety-shape morphology can be employed. Exemplary of suitable trioctahedral smectite clays are natural saponite, and preferably, natural hectorite and synthetic hectorite.

In addition to the above-discussed shape, it is most preferred that the particles of the starting clay comprise aggregates of randomly oriented platelets. In other words, the aggregates that form the particles of the clay preferably should contain platelets oriented face-to-edge and edge-to-edge in addition to platelets oriented face-to-face, which is the main mode of platelet aggregation in montmorillonite. Examples of swelling clays which have platelets with well-ordered face-to-face connections and hence are less preferred are natural montmorillonites and natural hectorites. Naturally occurring montmorillonite and hectorite are composed of well-ordered, pancake-shaped platelets and such a shape favors face-to-face orientation of the platelet aggregates upon air drying.

The most preferred swelling clay for use as the crystal size growth inhibitor are the synthetic hectorites. Procedures for preparing synthetic hectorites are well known and are described for example, in U.S. Pat. Nos. 3,803,026; 3,844,979; 3,887,454; 3,892,655 and 4,049,780, the disclosures of which is herein incorporated by reference. A typical example of synthetic hectorite is Laponite™ RD. Laponite RD™ clay is a filter pressed, tray dried and pin milled product. The platelets of Laponite™ RD clay are composed of two silica layers surrounding a layer of magnesium in octahedral coordination. Laponite™ RD) clay and other Laponites are manufactured and sold by Laporte Inorganics, a part of Laporte Industries Limited.

It has been found that the particle size of the alumina trihydrate when in admixture with the active alumina just prior to hydrothermal treatment is important.

Commercially available alumina trihydrate, e.g., gibbsite, will typically be composed of large particles having an average particle size of 100 microns or more.

To be effective ill the process of the present invention, it is important that the average particle size of the alumina trihydrate and active alumina which are subjected to hydrothermal treatment each and/or collectively possess an average particle size of typically from about 0.1 to about 15.0 (e.g., 1 to 15), preferably from about 0.1 to about 10.0 (e.g., 1 to 10), and most preferably from about 0.3 to about 8.0 (e.g., 1 to 8) microns.

This can be accomplished by separately milling the alumina trihydrate and active alumina and combining the milled materials, but is preferable to admix the alumina trihydrate and active alumina to form a slurry and sand mill the slurry to achieve the desired average particle size. The crystal size growth inhibitor additive component can be added before or after milling, although if the inhibitor is not completely soluble in the liquid medium, it is preferred to include it in the milling operation such as when the crystal size growth inhibitor is a swellable clay.

Most preferably it is desired to employ a DRAIS sand mill and pass the slurry through the same in multiple passes. In the first pass, mild conditions are typically employed to reduce the average particle size of the alumina components to an intermediate level of about 5 to about 20 microns. In the second pass, the milling conditions are controlled to be more severe by slowing the rate at which the slurry is passed through the mill. The milling is typically conducted at room temperature. Premature rehydration of the active alumina to boehmite prior to the hydrothermal treatment does not occur during the milling because of the short milling times of about 0.1 to about 2.0 hours and low milling temperatures of about 20 to about 35° C.

Once the desired particle size of the aluminum containing active ingredients, i.e., active alumina, alumina trihydrate is attained, a slurry of all the active ingredients (i.e., active alumina, alumina trihydrate and crystal size growth inhibitor additive component) in a liquid medium is prepared. The liquid medium should be capable of dissolving at least a portion of the alumina trihydrate under hydrothermal treatment conditions. The preferred liquid medium is water, preferably substantially (e.g., 50 to 100 wt. %) water, most preferably deionized water, although a liquid organic media, e.g., water miscible or water immiscible, can be employed and/or mixtures of water and organic media such as methanol, ethanol, or dimethyl sulfoxide.

The amount of the liquid medium employed to form the slurry is usually selected to obtain a solids content of active ingredients of from about 5 to about 30 wt. % based on the liquid medium and active ingredient weight. If the amount of the liquid is too small, the viscosity of the slurry tends to be too high, whereby the operation such as stirring tends to be difficult. On the other hand, if the amount of liquid is too great, an unnecessary amount of heat energy will be wasted during the hydrothermal treatment, such being uneconomical.

In general, the liquid medium and active ingredients are uniformly mixed either by co-milling as discussed above or, if not previously co-milled, by any conventional technique using, for example, a ball mill, an air stirrer, an ultrasonic mixer, a continuous screw type mixer or a screw auger. A ball mill may contain any suitable milling media such as alpha alumina milling media, or zirconia milling media.

Where the crystal size growth inhibitor additive component is a swellable clay, it is dispersed in the slurry under conditions which preferably will maximize the degree of dispersion. Some swellable clays are more readily dispersible than others. If the degree of dispersion attained during contact with the active alumina and alumina trihydrate is poor, the desired impact on the pore properties of the alumina may not be attained or maximized. Accordingly, steps may need to be taken to induce the proper degree of dispersion such as milling (preferably co-milling with the other active ingredients), total volatiles control, and/or the use of dispersing aids such as tetrasodium pyrophosphate ($N_4P_2O_7$) which happens to also function as a crystal size growth inhibitor.

The dispersable clay may be predispersed in water using a high shear mixer (e.g., Silverson) or other mixer such as a Cowles dissolver. Even a paddle-type agitator (e.g., Lightening mixer) can be used with longer stirring time and/or a tank with baffles to increase shear.

Attainment of the proper degree of dispersion of the swellable clay is difficult to quantify, but as a general rule, the greater the degree of clarity of the suspending medium, the better the dispersion and a completely clear medium (when only clay is present) is most preferred. This will typically occur when the clay particles are predominately colloidal in size, e.g., less than about 1 micron. The most common way to reduce the clay particles to colloidal size is by wet milling, dry milling or both using conventional milling equipment.

Accordingly, in the absence of co-milling, dispersion of the swellable clay can be accomplished by mixing the clay with water, preferably under conditions of high shear for periods of typically from about 5 to about 60 and preferably from about 10 to about 30 minutes. The temperature at which the dispersion is formed is not critical and will typically range from about 20 to about 40° C. It is important that the water not contain other minerals, e.g., deionized water is preferred, which would affect the dispersability of the clay. Water which contains a significant amount of alkaline earth salts or other highly charged cations may require TSPP to obtain a good dispersion of the clay.

The degree of dispersion is enhanced if the starting clay has a total volatile content of typically at least 8 and preferably at least 10 wt. % thereof, and can range typically from about 8 to about 25, preferably from about 10 to about 20 and most preferably from about 13 to about 18 wt. %.

The ratio of alumina trihydrate:active alumina in the slurry is controlled to be typically from about 0.6:1 to about 19:1, preferably from about 1:1 to about 9:1, and most preferably from about 1.5:1 to about 17:1.

The amount of the crystal size growth inhibitor (CSGI) is dependent on the desired boehmite properties. For example, increasing the level of the CSGI will reduce boehmite crystallite size, and increase surface area and pore volume. Thus, the amount of CSGI is typically controlled to provide a weight ratio of active alumina:inhibitor in the slurry of typically from about 100:1 to about 2:1, preferably from about 50:1 to about 5:1, and most preferably from about 20:1 to about 5:1. The amount of crystal size growth inhibitor can be alternatively expressed as typically varying from about 0.1 to about 10, preferably from about 0.2 to about 8, and most preferably from about 0.4 to about 5 wt. % based on the weight of the slurry active ingredients, i.e., alumina trihydrate, active alumina, and CSGI components.

More specifically, where the CSGI is a silicate, it will be present in the slurry at amounts of typically from about 0.2 to about 8, preferably from about 0.4 to about 6, and most preferably from about 0.5 to about 5 wt. %, based on the weight of the active ingredients in the slurry.

Where the CSGI is a hydroxide, it will be present at amounts of typically from about 0.5 to about 10, preferably from about 1 to about 8, and most preferably from about 2 to about 6 wt. %, based on the weight of the active ingredients in the slurry.

Where the CSGI is a phosphate, it will be present at amounts (including water of hydration) of typically from about 0.1 to about 10, preferably from about 0.2 to about 8, and most preferably from about 0.4 to about 6 wt. %, based on the weight of the active ingredients in the slurry.

Where the CSGI is a sulfate, it will be present at amounts of typically from about 0.5 to about 10, preferably from about 1 to about 8, and most preferably from about 2 to about 6 wt. %, based on the weight of the active ingredients in the slurry.

Where the CSGI is a swellable clay, it will be present in the slurry at amounts of typically from about 0.5 to about 8, preferably from about 1 to about 6, and most preferably from about 2 to about 5 wt. %, based on the weight of the active ingredients in the slurry.

Where combinations of CSGI are employed, the above weight percentages still reflect suitable amounts of each component in the combination, however the most preferred range will be slightly reduced since the CSGI will to some degree act in concert to reduce the boehmite crystallite size.

The above amounts of the CSGI in the slurry expressed as a weight percent of active ingredients is carried forward to the composite particles into which they are incorporated.

The hydrothermal treatment is conducted by subjecting a slurry containing the active ingredients to superatmospheric pressure, temperature, and time sufficient to convert both the alumina trihydrate and active alumina to a stable crystalline boehmite phase. From X-ray analysis, it appears that the alumina portion is fully converted to boehmite.

Thus, the temperature will typically be adjusted to about 150° C. or above during the hydrothermal treatment, because boehmite formation will typically not occur at a temperature below about 150° C. If the temperature employed is too high, e.g., above about 350° C., a boehmite phase can be converted into an ax-alumina phase over a long period of time, which is undesirable. Accordingly, it is preferable that the temperature of the hydrothermal treatment be maintained typically between about 150 and 350° C. and preferably between about 180° and about 250° C. Within such a temperature range, a higher temperature induces a higher rate of formation of the boehmite phase. Moreover, hydrothermal treatment at pressures exceeding several hundred atmospheres can give rise to a diaspore phase rather than a boehmite phase. The lower limit of the pressure is not critical as long as the target temperatures are achieved. The time and temperature are adjusted to obtain full conversion of the gibbsite to boehmite.

It is convenient to conduct the hydrothermal treatment in a hermetically sealed container such as an autoclave.

In view of the above, the hydrothermal treatment will typically be conducted at temperatures which can vary typically from about 150 to about 250, preferably from about 170 to about 225, and most preferably from about 190 to about 210° C. for periods of typically from about 0.1 to about 0.4, preferably from about 0.5 to about 3, and most preferably from about 1 to about 2 hours. The heat source is not critical and can include steam, microwave radiation, convection ovens, electric heating and the like.

The heating is preferably conducted under autogenous pressure which conventionally reaches from about 10 to about 20 atmospheres. The pressure can of course be generated artificially if desired without changing the essential nature of the invention. Such pressure can range from about 5 to about 20 atmospheres but preferably lies within the same range as autogenously generated pressure. As used herein, the term autogenous pressure refers to the pressure developed in the closed autoclave at temperature, but does not exclude an increased pressure by injection of vapor or gas into the autoclave to further control total pressure and/or composition in the reaction or a decreased pressure by bleeding off a portion of steam. Accordingly, and in view of the above, the pressure can vary typically from about 5 to about 20, preferably from about 10 to about 16, and most preferably from about 12 to about 15 atmospheres.

After completion of the hydrothermal treatment, the slurry is allowed to cool to a temperature of from about 20 to about 90° C. Cooling typically will take place with the same rate of agitation as during the autoclaving. After cooling is complete, the liquid of the slurry is removed by conventional means. Such methods include simply air drying the slurry. Other suitable methods include those known in the art to remove the free liquid (e.g., water) of the slurry and provide a dried product. Examples of such other methods include centrifuging or filtering. Preferably, deliquifying is accomplished by heating the slurry to promote evaporation. More preferably, the heating is carried out in a forced air oven at a temperature of about as 50°–200° C. (preferably about 100°–150° C.). Such heating can be done on a batch basis or on a continuous basis. The deliquifying step generally removes a significant portion of the liquid medium from the slurry; however, there still may be a minor portion of the liquid medium present in the resulting product. The slurry can be dried by other means such as spray drying or flash drying. Also, the slurry can be used without drying.

The dried composite particles can be further processed by washing to remove or reduce salts such as $Na_2O$, by calcining, agglomeration, and/or impregnation. During calcining, essentially all the volatiles are removed, and the boehmite phase will be converted [to] the other alumina phases. At the normal calcining temperature for surface area and pore volume measurements (2 hours at 538° C.) the alumina would be in the gamma phase.

During calcination, the material is generally heated to a temperature of typically from about 400 to about 1000, preferably from about 400 to about 800, and most preferably from about 500 to about 750° C. and held at this temperature until the free water, and preferably at least about 90 wt. % of any bound volatiles are removed. Calcining can be carried out before or after agglomeration and/or impregnation described below, or both before and after agglomeration and/or impregnation. Clay will typically dehydroxylate at 650°–700° C. calcination temperatures The composite product can be sized by any conventional means (e.g., by crushing or sieving). A crushing step can be done by any suitable means including hammer milling, roll crushing, or ball milling. Any method for comminuting the dried precursor material can be used. The term "crushing" is used to include all of such methods.

The composite product as formed will typically comprise (a) an aluminum oxide component comprising at least 70, preferably at least 85, and most preferably at least 90 wt. % crystalline boehmite having a range of crystallite sizes as described in more detail hereinafter, which crystalline boehmite content in the aluminum oxide component can range typically from about 70 to about 100, preferably from about 85 to about 95, and most preferably from about 90 to about 95 wt. % based on the weight of the aluminum oxide component and (b) crystal size growth inhibitor additive component residue intimately dispersed within the aluminum oxide component; the additive component being incorporated into boehmite crystallites as they form. More specifically, the CSGI, e.g., the alkaline earth metal, particularly the alkali metal, cations of the crystal size growth inhibitor can cause a reduction in the pore volume and surface area of the composite product upon calcination if present above certain threshold amounts. This can be disadvantageous for many applications. Such reductions in pore volume and surface area are typically exhibited when the alkali or alkaline earth metal cation content of the composite is above about 0.5 wt. % based on the composite weight. Thus, it may be desirable to exchange such cations with other cations which do not disadvantageously impact the morphological properties of the composite, or at least do go to a much lesser degree. The material used to bring about this result is referred to herein as an exchange salt.

Representative examples of cations suitable for use in the exchange salt include ammonium, those derived from dilute acids such as sulfuric, nitric, and HCL, transition metal salts derived from transition metals such as nickel, cobalt, molybdenum or tungsten and rare earth salts derived from rare earth elements such as those of the cerium subgroup of the Periodic Table.

The most preferred cations for effecting the cation exchange are ammonium cations. Accordingly, it is preferred to wash the initially formed boehmite composite with an aqueous solution of a water soluble exchange salt.

Representative examples of anions suitable for the exchange salt include sulfate, chloride and nitrate.

Representative examples of suitable exchange salts include ammonium sulfate, ammonium carbonate, ammonium nitrate, ammonium chloride, nickel chloride, cobalt sulfate, cobalt nitrate and the like.

Washing with an exchange salt solution will typically not replace significant amounts of the anion of the crystal size growth inhibitor because they tend to be retained more strongly than the cations, although the degree of anion exchange is not critical. In fact, the anions of the crystal size growth inhibitor may exert their own beneficial effect on catalysts prepared therefrom. For example, phosphate may help disperse the Ni, Co, Mo, or W on the impregnated catalyst and silicate may increase the acidity of the support and its thermal/hydrothermal stability.

The cation exchange wash can be conducted by slurrying, one or more times, the boehmite composite in an aqueous solution containing typically from about 0.1 to about 10, preferably from about 0.2 to about 8, and most preferably from about 0.4 to about 5 wt. % of the pertinent exchange salt. The boehmite content in the slurry is typically from about 10 to about 15 wt. % based on the slurry weight.

Typically, the boehmite is slurried in a dilute solution of the exchange salt for about 5 to about 30 minutes at 65° C. with moderate agitation. The pH may be reduced to about 4.5 to 5.7 with acid to help remove $Na_2O$ if present. The slurry is typically filtered and rinsed with water to remove salts. If the sulfate level is high, the material may be reslurried at a pH of 8 or above using ammonium hydroxide or ammonium carbonate to enhance the exchange.

As can be seen from the above, the final composition of the boehmite composite, with respect to the crystal size growth inhibitor additive component, is more accurately described as the composition resulting from the particular crystal growth inhibitor employed as modified, if at all, by a washing cation exchange step if employed. Accordingly, for convenience the final composition of the crystal size growth inhibitor component reflecting such modificationss is referred to herein as the crystal size growth inhibitor additive component residue.

Absent a cation exchange washing step, the amount and nature of the crystal size growth inhibitor additive component residue in the boehmite composite will reflect and be essentially the same as the starting amount and composition thereof employed in the slurry which is hydrothermally treated. After a cation exchange washing step, the amount of the original cation(s) of the crystal size growth inhibitor additive component remaining in the composite will be typically from about 0 to about 100, preferably from about 0 to about 10, and most preferably from about 0 to about 5 wt. % of the amount of cation(s) originally present prior to washing. Similarly, after a washing step, the amount of the original anions of the crystal size growth inhibitor remaining in the composite will be typically from about 50 to about 100, preferably from about 75 to about 100, most preferably from about 95 to about 100 wt. % of the amount originally present prior to washing.

Thus, any reduction of the original cation or anion content of the crystal size growth inhibitor in the composite will be accompanied by a corresponding replacement of the cation and anion species of the exchanging salt.

Accordingly, the residue of the crystal size growth inhibitor additive component in the composite can be characterized as comprising any of the original crystal size growth inhibitors described above together with any of the exchange salts such that the total residue will constitute typically from about 0.5 to about 10, preferably from about 0.5 to about 5, most preferably from about 0.5 to about 3 wt. % based on the weight of the combined weight of the aluminum oxide component and additive component residue.

The boehmite portion of the resulting aluminum oxide component of the composite will exhibit the crystal form typically associated with conventional boehmite, such for example as described in U.S. Pat. No. 4,716,029 at col. 1, lines 19 et seq., but may also include non-conventional forms. At high levels of crystal size growth inhibitor, the boehmite will be present as pseudo boehmite, i.e., it may have very small crystallites. At these high levels, crystallite sizes of 30 to 60 Å are usually obtained.

The crystallite size of the boehmite crystals of the aluminum oxide component is typically from about 20 to about 200 (e.g., 100 to 200), preferably from about 30 to about 150 (e.g., 120–150), and most preferably from about 35 to about 100 Å.

Boehmite crystallite size can be determined by the following procedure. A sample is hand ground with a mortar and pestle. An even layer of the sample is placed on 3.5 gm PVA (polyvinyl alcohol) and pressed for 10 seconds at 3,000 psi to obtain a pellet. The pellet is then scanned with Cu K alpha radiation and the diffraction pattern between 22 and 33 degrees 2 theta is plotted. The peak at 28 degrees 2 theta is used to calculate the crystallite size using the Scherer equation (Eq. 1 below) and the measured peak width at half height. A correction for instrument broadening is determined by performing the same profile fit routine to a scan of a NIST SRM 660 (provides a laboratory lanthanum hexaborate line profile calibration) and then using the peak width for the standard as b in the equation:

$$\text{Crystallite Size} = 81.9 \sqrt{B^2 b^2} \qquad (Eq.2)$$

Where

B=Peak width of sample b=Peak width of standard

The above discussed 22–33 degree scan angle is appropriate for samples which do not contain amounts of other aluminum oxide crystalline forms in addition to boehmite sufficient to mask the signature peaks of boehmite (e.g., gibbsite). If such masking is observed, one would resort to other unmasked signature peaks for crystallite size determination such as located at 14, 28, 38, and 48° 2θ.

The quantity of the crystalline boehmite in an aluminum oxide, containing non-boehmite forms thereof, can be determined as described hereinafter in connection with agglomerates.

Samples are dried in an oven overnight at 142° C. prior to quantifying the crystalline boehmite content.

The resulting composite particles can be recovered, thermally activated under the same conditions as described for agglomerates hereinafter or used directly to conduct application of catalyst thereto.

Preferably, the composite particles are recovered and dried and optionally sized. Suitable particle sizes can range typically from about 1 to about 150 (e.g., 1 to about 100), preferably from about 2 to about 60, and most preferably from about 2 to about 50 microns.

Recovery is accomplished by filtration, evaporation, centrifugation and the like. The slurry may also be spray dried to effect recovery.

The resulting composite particles have a nitrogen surface area of typically at least about 80 preferably at least about 150 and most preferably at least about 200 $m^2/g$, which surface area can range typically from about 80 to about 500 preferably from about 150 to about 450, and most preferably from about 200 to about 400 $m^2/g$.

The average nitrogen pore diameter of the composite particles at a nitrogen partial pressure of $p/p_o$ of 0.995 will range typically from about 60 to about 1,000, preferably from about 80 to about 500, and most preferably from about 90 to about 350 Angstroms.

The total nitrogen pore volume of the composite particles under the same nitrogen partial pressure can vary from about 0.2 to about 2.5, preferably from about 0.5 to about 2.4 and most preferably from about 1.0 to about 2.3 cc/g.

It is an advantage of the present invention that the combined use of active alumina and crystal size growth inhibitor increases the average nitrogen pore diameter and total pore volume while simultaneously increasing the surface area. Thus, by varying the conditions of synthesis one can control and vary the pore volume and average pore diameter to achieve enhanced catalytic activity without loss of surface area. High average pore diameter catalysts can be prepared with metals impregnation prior to high temperature calcination alleviating the need for pre-steaming to increase average pore diameter.

The macropore content (i.e., % of those pores within the total nitrogen pore volume which fall within the macropore region) of the composite particles will be typically not greater than about 90, preferably not greater than about 75, and most preferably not greater than about 60% of the total pore volume, which macropore content will range typically from about 0 to about 90, preferably from about 5 to about 75, and most preferably from about 5 to about 60% % of the total pore volume.

The nitrogen mesopore content will range typically from about 10 to about 100, preferably from about 15 to about 90, and most preferably from about 30 to about 80% of the total pore volume. Moreover, typically at least about 20, preferably at least about 40, and most preferably at least about 60% of the pores within the mesopore region will have pore diameters of typically from about 100 to about 400, preferably from about 100 to about 300, and most preferably from about 100 to about 250 Angstroms.

The nitrogen mesopore content of the composite particles as formed also desirably will possess a pore mode, preferably only a single pore mode (monomodal), of typically from about 60 to about 400, preferably from about 70 to about 300, and most preferably from about 80 to about 250 Angstroms.

The nitrogen micropore content of the composite particles will be typically not greater than about 80, preferably not greater than about 60 and most preferably not greater than about 50% of the total pore volume which micropore content can range typically from about 0 to about 80, preferably from about 5 to about 60 and most preferably from about 10 to about 50 % of the total pore volume.

In addition, the agglomerates may be mixed with other conventional aluminas to produce supports having a pore size distribution with two or more modes in the mesopore region. Each alumina contributes a mesopore mode at its unique characteristic position. Mixtures of two or more aluminas prepared with the swellable clays having varying pore modes are also contemplated.

While the composite alumina particles can be used directly as supports, it is more conventional to agglomerate the particles for such use.

Such alumina agglomerates can be used as catalysts or catalyst supports in any reaction which requires a particular pore structure together with very good mechanical, thermal and hydrothermal properties. The boehmite agglomerates of the present invention can thus find particular applicability as catalyst supports in the treatment of exhaust gases generated by internal combustion engines and in hydrogen treatments of petroleum products, such as hydrodesulfurization, hydrodemetallation and hydrodenitrification. They can also be used as catalyst supports in reactions for the recovery of sulfur compounds (Claus catalysis), the dehydration, reforming, steam reforming, dehydrohalogenation, hydrocracking, hydrogenation, dehydrogenation, and dehydrocyclization of hydrocarbons or other organic compounds, as well as oxidation and reduction reactions.

They may also be used as catalysts per se in reactions typically catalyzed by aluminas such as hydrocracking and isomerization reactions.

Thus, the advantageous properties of enhanced pore volume at high surface area, good mechanical strength, and hydrothermal stability of the composite particles are passed on to the agglomerates.

More specifically, once established, the pore properties of the agglomerate are thermally stable and remain essentially unaffected by heat treatment at moderate temperatures of 500–700° C. either before or after impregnating the supports with catalytic metals.

The term "agglomerate" refers to a product that combines particles which are held together by a variety of physical-chemical forces.

More specifically, each agglomerate is composed of a plurality of contiguous, constituent primary particles, sized as described above, preferably joined and connected at their points of contact.

Thus, the agglomerates of the present invention may exhibit a higher macropore content than the constituent primary particles because of the interparticle voids between the constituent composite alumina particles.

Nevertheless, the agglomerate particles still preserve the higher pore volumes in the mesopore region.

Accordingly, the agglomerates of the present invention are characterized as having the following properties after calcination to the gamma phase:

(1) A surface area of at least about 100, preferably at least about 150 and most preferably from at least about 200 $m^2/g$ which surface area can range typically from about 100 to about 450, preferably from about 125 to about 425, and most preferably from about 150 to about 400 $m^2/g$, (2) An average pore diameter of typically from about 50 to about 500, preferably from about 60 to about 400, and most preferably from about 70 to about 300 Angstroms, (3) A total mercury pore volume of from about 0.2 to about 2.5, preferably from about 0.5 to about 2.4, and most preferably from about 1.0 to about 2.3 cc/g, (4) A macropore content (i.e., those pores within the total pore volume which fall within the macropore region) of typically not greater than about 90 preferably not greater than about 80, and most preferably not greater than about 50% of the total pore volume, which macropore content will range typically from about 0 to about 90, preferably from about 5 to about 80, and most preferably from about 5 to about 50% of the total pore volume, (5) A mesopore content of typically from about 10 to about 100, preferably from about 15 to about 90, and most preferably from about 30 to about 80% of the total pore volume. Moreover, typically at least about 20, preferably at least about 40, and most preferably at least about 60% of the pores within the mesopore region will have pore diameters of typically from about 100 to about 400, preferably from about 100 to about 300, and most preferably from about 100 to about 250 Angstroms.

The mesopore content of the agglomerate particles as formed also desirably will possess a mesopore pore mode of typically from about 60 to about 400, preferably from about 70 to about 300, and most preferably from about 80 to about 250 Angstroms.

The average agglomerate particle diameter is typically from about 0.5 to about 5, preferably from about 0.6 to about 2, and most preferably from about 0.8 to about 1.5 mm.

In addition, the agglomerates may be mixed with other conventional aluminas to produce supports having a pore size distribution with two or more modes in the mesopore region. Each alumina contributes a mesopore mode at its unique characteristic position. Mixtures of these aluminas can also be prepared as agglomerates with bimodal pore size distributions. The mixtures and the resulting pore modes can be tailored to match the size/molecular weights of the reactants.

The agglomeration of the alumina composite is carried out in accordance with the methods well known to the art, and, in particular, by such methods as pelletizing, extrusion, shaping into beads in a rotating coating drum, and the like. The nodulizing technique whereby composite particles having a diameter of not greater than about 0.1 mm are agglomerated to particles with a diameter of at least about 1 mm by means of a granulation liquid may also be employed.

As is known to those skilled in the art, the agglomeration may optionally be carried out in the presence of additional amorphous or crystalline binders, and pore-forming agents may be added to the mixture to be agglomerated. Conventional binders include other forms of alumina, silica, silica-alumina, clays, zirconia, silica-zirconia, magnesia and silica-boria. Conventional pore-forming agents which can be used in particular, include wood flour, wood charcoal, cellulose, starches, naphthalene and, in general, all organic compounds capable of being removed by calcination. The addition of pore forming agents, however, is not necessary or desirable.

If necessary, the aging, drying and/or calcination of the agglomerates are then carried out.

The agglomerates, once formed, are then typically subjected to a thermal activation treatment (i.e., calcination) at a temperature in the range of typically from about 300 to about 900, preferably from about 400 to about 800, and most preferably from about 450 to about 750° C. for periods of typically from about 0.1 to about 4, preferably from about 0.2 to about 3, and most preferably from about 0.5 to about 2 hours. The atmosphere of activation is typically air, but can include inert gases such as nitrogen. The alumina powder from which the agglomerate is derived is typically not calcined prior to agglomeration because it can become difficult to bind the particles together to form the agglomerate.

The activation treatment can be carried out in several steps if desired or be part of the agglomerate treatment. Depending on the particular activation temperature and time employed, the alumina agglomerates predominantly exhibit the crystal structure characteristic of boehmite, or gamma alumina, or mixtures thereof.

More specifically, at calcination temperatures and times increasingly above about 300° C. and one hour, the boehmite will be increasingly converted to gamma alumina. However, the gamma alumina will possess the pore properties of the boehmite from which it is derived. Moreover, at the preferred calcination temperatures and times substantially all of the crystalline boehmite is converted to gamma alumina. Consequently, the sum of the crystalline boehmite content (wt. %) discussed above plus the gamma alumina content resulting from calcination of the boehmite, will not typically exceed the original boehmite content derived from rehydration of the active alumina. This conclusion applies equally to composite particles which are activated and used directly in composite particle form without agglomeration.

The percent $\gamma$-$Al_2O_3$ (gamma alumina) in an alumina sample is determined as follows:

(1) 100% $\gamma$-$Al_2O_3$ is defined as an integrated intensity (area under the peak) of the (440) peak of a $\gamma$-$Al_2O_3$ standard.

(2) The (101) peak intensity of a Quartz plate is used as an X-ray intensity monitor.

(3) Data collection is performed on a Philips® 3720 automatic diffractometer equipped with a graphite diffract beam monochromator and sealed Cu X-Ray tube. The X-ray generator is operated at 45 kV and 40 mA.

(4) Full width at half maximum (FWHM) and integrated intensity (area under the peak) of the (440) $\gamma$-$Al_2O_3$ peak are obtained by curve fitting. In the case where one peak can not yield a good fit of the peak, two peaks are used. In the case where two peaks are used for curve fitting, two crystallite sizes are obtained by using Equation 3. Percent $\gamma$-$Al_2O_3$ of the two crystallite sizes are obtained by using Equation 2.

(5) The percentage of $\gamma$-$Al_2O_3$ of a sample is determined by the following equation:

$$\%_{\gamma-Al2O3}=(I_{sample}*I_{quartz.c})/(I_{standard}*I_{quartz.s}) \quad \text{(Equation 3)}$$

wherein:

$I_{sample}$=Integrated intensity of the (440) peak of sample;

$I_{quartz.c}$=Intensity of the (101) quartz peak, measured at the time that the standard $\gamma$-$Al_2O_3$ is measured;

$I_{standard}$=Integrated intensity of the (440) peak of the standard $\gamma$-$Al_2O_3$; and $I_{quartzs}$=Intensity of the (101) quartz peak, measured at the time the sample is measured.

$\gamma$-$Al_2O_3$ crystallite size (L) is determined by the following procedure. The sample is hand ground with a mortar and pestle. An even layer of the sample is placed on 3.5 gms polyvinyl alcohol (PVA) and pressed for 10 seconds at 3,000 psi to obtain a pellet. The pellet is then scanned with Cu K Alpha radiation and, the diffraction pattern between 63 and 73 degrees (2θ) is plotted. The peak at 66.8 degrees (2θ) is used to calculate the crystallite size using Equation 4 and the measured peak width at half height.

$$L(\text{size in Å})=82.98/FWHM(2\theta°)\cos(\theta°) \quad \text{(Equation 4)}$$

wherein:

FWHM=Full width at half maximum; and

θ=The angle of diffraction between X-ray beam and planar surface on which the sample is sitting.

The percent boehmite present in an alumina sample to crystalline boehmite is determined as follows:

(1) 100% boehmite is defined as an integrated intensity (area under the peak) of the (020) peak of Catapal alumina.

(2) The (101) peak intensity of a Quartz plate is used as an X-ray intensity monitor.

(3) Data collection is performed on a Philips® 3720 automatic diffractometer equipped with a graphite diffract beam monochromator and sealed Cu X-Ray tube. The X-ray generator is operated at 45 kV and 40 mA (4) Full width at half maximum (FWHM) and integrated intensity (area under the peak) of the (020) boehmite peak are obtained by curve fitting. In the case where one peak can not yield a good fit of the peak, two peaks are used. In the case where two peaks are used for curve fitting, two crystallite sizes are obtained by using Equation 6. Percent boehmite of the two crystallite sizes are obtained by using Equation 5.

(5) The percentage of boehmite of a sample is determined by the following equation:

$$\%_{boehmite}=(I_{sample}*I_{quartz.c})/(I_{catapal}*I_{quartz.s}) \quad \text{(Equation 5)}$$

wherein $I_{sample}$=Integrated intensity of the (020) peak of sample;

$I_{quartz.c}$=Intensity of the (101) quartz peak, measured at the time Catapal alumina was measured;

$I_{catapal}$=Integrated intensity of the (020) peak of the Catapal alumina; and $I_{quartzs}$=Intensity of the (101) quartz peak, measured at the time sample was measured.

Boehmite crystallite size (L) is determined by the following procedure. The sample is hand ground with a mortar and pestle. An even layer of the sample is placed on 3.5 gms polyvinyl alcohol (PVA) and pressed for 10 seconds at 3,000 psi to obtain a pellet. The pellet is then scanned with Cu K Alpha radiation and the diffraction pattern between 22 and 33 degrees (2θ) is plotted. The peak at 28 degrees (2θ) is used to calculate the crystallite size using Equation 6 and the measured peak width at half height.

$$L(\text{size in Å})=82.98/FWHM(2\theta°)\cos(\theta°) \quad \text{(Equation 6)}$$

wherein

FWHM=Full width at half maximum; and

θ=The angle of diffraction between X-ray beam and planar surface on which the sample is sitting.

The alumina composite particles are particularly adapted for use as supports for a variety of catalyst systems employing heavy metals as the catalyst component. Consequently, the metal components of such catalysts must be added and incorporated into alumina composite.

Such additions can be achieved by mixing the catalytic materials with the alumina before or after hydrothermal treatment during the preparation of the agglomerates, e.g., extrudates or pellets and the like, by coating the alumina agglomerates, such as extrudates or pellets, with catalytic material by immersion in solutions containing the catalytic material and the like. The "dry" impregnation technique is another suitable alternative wherein the composite particles or agglomerates are contacted with a quantity of impregnation liquid, the volume of which corresponds to the pore volume of the support. Other and additional methods of modifying the alumina may appear desirable to those skilled in the art.

The porous composite aluminas of the present invention are particularly useful when employed as supports for catalytically active hydrogenation components such as Group VIB and Group VIII metals. These catalytically active materials can be suitably applied in hydroprocessing operations.

More specifically, "hydroprocessing" as the term is employed herein means oil refinery processes for reacting petroleum feedstocks (complex mixtures of hydrocarbon present in petroleum which are liquid at conditions of standard temperature and pressure) with hydrogen under pressure in the presence of a catalyst to lower: (a) the concentration of at least one of sulfur, contaminant metals, nitrogen, and Conradson carbon, present in said feedstock, and (b) at least one of the viscosity, pourpoint, and density of the feedstock. Hydroprocessing includes hydrocracking, isomerization/dewaxing, hydrofinishing, and hydrotreating processes which differ by the amount of hydrogen reacted and the nature of the petroleum feedstock treated.

Hydrofinishing is typically understood to involve the hydroprocessing of hydrocarbonaceous oil containing predominantly (by weight of) hydrocarbonaceous compounds in the lubricating oil boiling range ("feedstock") wherein the feedstock is contacted with solid supported catalyst at conditions of elevated pressure and temperature for the purpose of saturating aromatic aid olefinic compounds and removing nitrogen, sulfur, and oxygen compounds present within the feedstock, and to improve the color, odor, thermal, oxidation, and UV stability, properties of the feedstock.

Hydrocracking is typically understood to involve the hydroprocessing of predominantly hydrocarbonaceous compounds containing at least five (5) carbon atoms per molecule ("feedstock") which is conducted: (a) at superatmospheric hydrogen partial pressure; (b) at temperatures typically below 593.3° C. (1100° F.); (c) with an overall net chemical consumption of hydrogen; (d) in the presence of a solid supported catalyst containing at least one (1) hydrogenation component; and (e) wherein said feedstock typically produces a yield greater than about one hundred and thirty (130) moles of hydrocarbons containing at least about three (3) carbon atoms per molecule for each one hundred (100) moles of feedstock containing at least five (5) carbon atoms per molecule.

Hydrotreating is typically understood to involve the hydroprocessing of predominantly hydrocarbonaceous compounds containing at least five carbon atoms per molecule ("feedstock") for the desulfurization and/or denitrification of said feedstock, wherein the process is conducted: (a) at superatmospheric hydrogen partial pressure; (b) at temperatures typically below 593.3° C. (1100° F.); (c) with an overall net chemical consumption of hydrogen; (d) in the presence of a solid supported catalyst containing at least one hydrogenation component; and (e) wherein: (i) the feedstock produces a yield of typically from about 100 to about 130 moles (inclusive) of hydrocarbons containing at least three carbon atoms per molecule for each 100 moles of the initial feedstock; or (ii) the feedstock comprises at least 50 liquid volume percent of undeasphalted residue typically boiling at about 565.6° (1050° F.) as determined by ASTM D-1160 Distillation and where the primary function of the hydroprocessing is to desulfurize said feedstock or (iii) the feedstock is the product of a synthetic oil producing operation.

Isomerization/dewaxing is typically understood to involve hydroprocessing predominantly hydrocarbonaceous oil having a Viscosity Index (VI) and boiling range suitable for lubricating oil ("feedstock") wherein said feedstock is contacted with solid catalyst that contains, as an active component, microporous crystalline molecular sieve, at conditions of elevated pressure and temperature and in the presence of is hydrogen, to make a product whose cold flow properties are substantially improved relative to said feedstock and whose boiling range is substantially within the boiling range of the feedstock.

More specifically, well known hydroprocessing catalyst components typically include at least one component of a metal selected from the group consisting of Group VIII metals, including Group VIII platinum group metals, in particular platinum and palladium, the Group VIII iron group metals, in particular cobalt and nickel, the Group VIB metals, in particular molybdenum and tungsten, and mixtures thereof. If the feedstock has a sufficiently low sulfur content, e.g., less than about 1 weight percent and preferably less than about 0.5 weight percent, the Group VIII platinum group metals may be employed as the hydrogenation component. In this embodiment, the Group VIII platinum group metal is preferably present in an amount in the range of about 0.01 weight percent to about 5 weight percent of the total catalyst, based on elemental platinum group metal. When the feedstock being treated contains more than about 1.0 weight percent sulfur, the hydrogenation component is preferably a combination of at least one Group VIII iron group metal and at least one Group VIB metal. The non-noble metal hydrogenation components are preferably present in the final catalyst composition as oxides or sulfides, more preferably as sulfides. Preferred overall catalyst compositions contain at least about 2, preferably about 5 to about 40, wt. % Group VIB metal, more preferably molybdenum and/or tungsten, and typically at least about 0.5, and preferably about 1 to about 15, wt. % of Group VIII of the Periodic Table of Elements, more preferably nickel and/or cobalt, determined as the corresponding oxides. The sulfide form of these metals is more preferred due to higher activity, selectivity and activity retention.

The catalyst components, e.g., hydroprocessing catalyst components, can be incorporated into the overall catalyst composition by any one of numerous procedures as described.

Although the non-noble metal components can be combined into the catalyst as the sulfides, this is not preferred. Such components are usually combined as a metal salt which can be thermally converted to the corresponding oxide in an oxidizing atmosphere or reduced with hydrogen or other reducing agent. The composition can then be sulfided by reaction with a sulfur compound such as carbon disulfide, hydrogen sulfide, hydrocarbon thiols, elemental sulfur, and the like.

Catalyst components can be incorporated into the composite alumina at any one of a number of stages in the catalyst preparation. For example, metal compounds, such as the sulfides, oxides or water-soluble salts such as ammonium heptamolybdate, ammonium tungstate, nickel nitrate, cobalt sulfate and the like, can be added by co-milling, impregnation or precipitation, after rehydration but before the composite is finally agglomerated. In the alternative, these components can be added to the composite after agglomeration by impregnation with an aqueous, alcoholic or hydrocarbon solution of soluble compounds or precursors. Impregnation is the preferred technique.

A further embodiment of the present invention is directed to a process for the hydrotreating of a hydrocarbon feedstock in at least one ebullated bed reaction zone. More particularly, the hydrocarbon feedstock is contacted with hydrogen in one or a series of ebullated bed reaction zones in the presence of a hydroprocessing catalyst comprising a hydrogenation component of catalytic metals and derivatives as described above deposited on agglomerates of the alumina composite described herein.

As is well known these feedstocks contain nickel, vanadium, and asphaltenes, e.g., about 40 ppm up to more than 1,000 ppm for the combined total amount of nickel and vanadium and up to about 25 wt. % asphaltenes. Further, the economics of these processes desirably produce lighter products as well as a fully demetallized residual by-product, which can be used to make anode grade coke This process is particularly useful in treating feedstocks with a substantial amount of metals containing 150 ppm or more of nickel and vanadium and having a sulfur content in the range of about 1 wt. % to about 10 wt. %. Typical feedstocks that can be treated satisfactorily by the process of the present invention contain a substantial amount of components that boil appreciably above 537.8° C. (1,000° F.). Examples of typical feedstocks are crude oils, topped crude oils, petroleum hydrocarbon residua, both atmospheric and vacuum residua, oils obtained from tar sands and residua derived from tar sand oil, and hydrocarbon streams derived from coal. Such hydrocarbon streams contain organometallic contaminants which create deleterious effects in various refining processes that employ catalysts in the conversion of the particular hydrocarbon stream being treated. The metallic contaminants that are found in such feedstocks include, but are not limited to, iron, vanadium, and nickel.

While metallic contaminants, such as vanadium, nickel, and iron, are often present in various hydrocarbon streams, other metals are also present in a particular hydrocarbon stream. Such metals exist as the oxides or sulfides of the particular metal, or as a soluble salt of the particular metal, or as high molecular weight organometallic compounds, including metal naphthenates and metal porphyrins, and derivatives thereof.

Another characteristic phenomenon of hydrotreating heavy hydrocarbons is the precipitation of insoluble carbonaceous substances from the asphaltenic fraction of the feedstock which cause operability problems. The amount of such insolubles formed increases with the amount of material boiling over 537.8° C. (1,000° F.) which is converted or with an increase in the reaction temperature employed. These insoluble substances, also known as Shell hot filtration solids, create the operability difficulties for the hydroconversion unit and thereby circumscribe the temperatures and feeds the unit can handle. In other words, the amount of solids formed limit the conversion of a given feedstock. Operability difficulties, as described above, may begin to manifest themselves at solids levels as low as 0.1 wt. %. Levels below 0.5 wt. % are generally recommended to prevent fouling of process equipment. A description of the Shell hot filtration test is found at A. J. J., Journal of the Inst. of Petroleum (1951) 37, pp. 596–604 by Van Kerkvoort, W. J. and Nieuwstad, A. J. J. which is incorporated herein by reference.

It has been speculated that such insoluble carbonaceous substances are formed when the heavy hydrocarbons are converted in the hydroconversion unit, thereby rendering them a poorer solvent for the unconverted asphaltenic fraction and hence creating the insoluble carbonaceous substances. The formation of such insolubles can be decreased by having most of the surface area in the hydroconversion catalyst accessible by very large pores so that most of the catalyst surface is accessible to large asphaltenic molecules. Also, the large pores facilitate deposition of nickel and vanadium in the hydrotreating catalyst. Thus, it may be desirable to increase the macropore content of the agglomerates of the present invention by techniques well known in the art for hydrotreating applications.

It has been discovered that the use of a CSGI offers the formulator a means for adjusting the pore size distribution of pores in the region of 400 to 80 Å to accommodate changes in molecular weight of the feed being processed to control diffusion effects.

The composites of the present invention are particularly adopted for use in hydrotreating.

Hydrotreating operations are typically carried out in one or a series of ebullated bed reactors. As previously elucidated, an ebullated bed is one in which the solid catalyst particles are kept in random motion by the upward flow of liquid and gas. An ebullated bed typically has a gross volume of at least 10 percent greater and up to 70% greater than the solids thereof in a settled state. The required ebullation of the catalyst particles is maintained by introducing the liquid feed, inclusive of recycle if any, to the reaction zone at linear velocities ranging from about 0.02 to about 0.4 feet per second and preferably, from about 0.05 to about 0.20 feet per second.

The operating conditions for the hydrotreating of heavy hydrocarbon streams, such as petroleum hydrocarbon residua and the like, are well known in the art and comprise a pressure within the range of about 1,000 psia (68 atmos) to about 3,000 psia (204 atmos), an average catalyst bed temperature within the range of about 700° F. (371° C.) to about 850° F. (454° C.), a liquid hourly space velocity (LHSV) within the range of about 0.1 volume of hydrocarbon per hour per volume of catalyst to about 5 volumes of hydrocarbon per hour per volume of catalyst, and a hydrogen recycle rate or hydrogen addition rate within the range of about 2,000 standard cubic feet per barrel (SCFB) (356 $m^3/m^3$) to about 15,000 SCFB (2,671 $m^3/m^3$). Preferably, the operating conditions comprise a total pressure within the range of about 1,200 psia to about 2,000 psia (81–136 atmos); an average catalyst bed temperature within the range of about 730° F. (387° C.) to about 820° F. (437° C.); and a LHSV within the range of about 0.1 to about 4.0; and a hydrogen recycle rate or hydrogen addition rate within the range of about 5,000 SCFB (890 $m^3/m^3$) to about 10,000 SCFB (1,781 $m^3/m^3$). Generally, the process temperatures and space velocities are selected so that at least 30 vol. % of the feed fraction boiling above 1,000° F. is converted to a product boiling below 1,000° F. and more preferably so that at least 70 vol. % of the subject fraction is converted to a product boiling below 1,000° F.

For the treatment of hydrocarbon distillates, the operating conditions would typically comprise a hydrogen partial pressure within the range of about 200 psia (13 atmos) to about 3,000 psia (204 atmos); an average catalyst bed temperature within the range of about 600° F. (315° C.) to about 800° F. (426° C.); a LHSV within the range of about 0.4 volume of hydrocarbon per hour per volume of catalyst to about 6 volumes of hydrocarbon recycle rate or hydrogen addition rate within the range of about 1,000 SCFB (178 m³/m³) to about 10,000 SCFB (1,381 m³/m³). Preferred operating conditions for the hydrotreating of hydrocarbon distillates comprise a hydrogen partial pressure within the range of about 200 psia (13 atmos) to about 1,200 psia (81 atmos); an average catalyst bed temperature within the range of about 600° F. (315° C.) to about 750° F. (398° C.); a LHSV within the range of about 0.5 volume of hydrocarbon per hour per volume of catalyst to about 4 volumes of hydrocarbon per hour per volume of catalyst; and a hydrogen recycle rate or hydrogen addition rate within the range of about 1,000 SCFB (178 m³/m³) to about 6,000 SCFB (1,068 m³/m³).

The most desirable conditions for conversion of a specific feed to a predetermined product, however, can be best obtained by converting the feed at several different temperatures, pressures, space velocities and hydrogen addition rates, correlating the effect of each of these variables and selecting the best compromise of overall conversion and selectivity.

All references herein to elements or metals belong to a certain Group refer to the Periodic Table of the Elements and Hawley's Condensed Chemical Dictionary, 12$^{th}$ Edition. Also, any references to the Group or Groups shall be to the Group or Groups as reflected in this Periodic Table of Elements using the CAS system for numbering groups.

The following examples are given as specific illustrations of the claimed invention. It should be understood, however, that the invention is not limited to the specific details set forth in the examples. All parts and percentages in the examples, as well as in the remainder of the specification, are by weight unless otherwise specified. Unless otherwise, specified herein, all surface area and pore property determinations or recitations in the specification and claims are to be construed as being made on samples which have been calcined at 537.8° C. (1000° F.) for 2 hours at atmospheric pressure in air.

Regarding Tables 1A and 1B, the crystal size growth inhibitors used were silicate as sodium silicate, caustic as NaOH, tetrasodium pyrophosphate (TSPP), i.e., $Na_4P_2O_7$), sodium sulfate ($Na_2SO_4$), and Laponite™. The Laponite™ used is reported on a dry basis and adjusted for the total volatiles (TV) measured at 954.4° C. (1750° F.). The source of NaOH was both from sodium silicate (3.2 $SiO_2/Na_2O$) and from NaOH. The TSPP was added as a 10 hydrate but the water was not included in the reported weight added, i.e., $Na_4P_2O_7$ was used. The gibbsite TV was determined to be 34.65% as measured at 954.4° C. (1750° F.). When a milled slurry of gibbsite was prepared the % solids were determined by first drying a weighted portion of the slurry at 137.8° C. (280° F.) and then calcining for 1 hour at 954.4° C. (1750° F.). The TV of the calcined alumina seeds were determined by calcination at 954.4° C. (1750° F.) and measuring the weight loss.

Furthermore, the % solids reported in Column 1 of Table 1A represents the total wt. % solids in the slurry which is autoclaved. Columns 7 and 9 of Table 1A represent the % of the solids of Column 1 which constitute alumina seed (Col. 7) and CSGI (Col. 9) respectively. Column 8 of Table 1A represents the % of the solids of Column 9 which correspond to the individual components making up the total CSGI of Column 9.

Further, any range of numbers recited in the specification or claims, such as that representing a particular set of properties, conditions, physical states or percentages, is intended to literally incorporate expressly herein any number falling within such range, including any subset of numbers within any range so recited.

COMPARATIVE EXAMPLE 1

This Comparative Example describes a typical boehmite product derived, from gibbsite. The gibbsites employed are available under the tradename SUPERFINE, HYDRAL. 710, and FRF85 from ALCAN, ALCOA, and ALCAN respectively. The average particle size (APS) for each gibbsite sample in microns for Runs 1 to 3 was 11, 7, and 4 respectively, The APS for the gibbsite used in Runs 4–5 was unavailable. Accordingly, slurries of these fine size gibbsites were prepared by adding each one to water to about 15% solids. The slurries were autoclaved for 1 hour at 200° C. with agitation and then dried overnight at 138° C. All gave large boehmite crystallites with low nitrogen pore volumes which are also reported at Table 1, Runs 1 to 5.

COMPARATIVE EXAMPLE 2

This example illustrates the effect of varying the amount of boehmite seed on the morphological properties of boehmite derived from hydrothermally treated gibbsite. Slurries of sand milled gibbsite available from ALCOA under the tradename C-30D were added to slurries of water and varying amounts of boehmite seeds having a crystallite size of 130 Angstroms. The final solids content was about 20 wt. %. Each slurry was autoclaved with agitation at 200° C. and then oven dried overnight at 138° C. The results are summarized at Table 1, Runs 6–9. As can be seen from Table 1, increasing the seeding level had only a relatively small effect on reducing crystallite size and increasing pore volume of the resulting boehmite product.

EXAMPLE 1

This example illustrates the effect of a crystal size growth inhibitor and alumina seed content on the boehmite crystallite size and pore properties. To slurries (characterized by Columns 2, 3 and 4 of Table 1A) of a gibbsite available from ALCOA under the tradename C-30 D, which had been reduced in particle size by milling the slurry at a 1500 ml/minute rate and a second pass at 800 ml/minute to an average particle size of about 3 microns, were added slurries of active alumina available from ALCOA under the tradename CP-3, and a solution of sodium silicate and sodium hydroxide (which in some cases, i.e., for Run 12 was aged for 18 hours, and for Run 13, 1 hour) in varying amounts such that the contents of the resulting slurries which are autoclaved is summarized at Table 1A, Runs 10 to 13.

The slurries were autoclaved at 200° C. for 1 or 2 hours as reported at Table 1A. The results of product characterization are summarized at Table 1B, Runs 10–13. Table 1B illustrates that under these reaction conditions, the 30% seeded batches of Runs 12 and 13 gave much higher pore volumes and surface areas than the 20% seeded batches of Runs 10 and 11.

EXAMPLE 2

This example illustrates the effect of milling gibbsite on the pore volume of the resulting boehmite. To a milled slurry of gibbsite obtained from Reynolds Aluminum Co., under the tradename RH30 was added either CP-3 (a 3 micron APS active alumina) or AP-15 (an 8 micron APS active alumina) along with 2% sodium silicate at a $Na_2O:SiO_2$ molar ratio of 1.0. The final solids for both slurries was about 15 wt. %. The individual amounts expressed as a percentage of solids are summarized at columns 4, 7, and 9 of Table 1A. After autoclaving for 2 hours at 200° C., the slurries were dried overnight at 138° C. Product analysis results are summarized at Table 1B, Runs 14 and 15. As can be seen therefrom, the smaller particle size alumina seed yielded a higher pore volume boehmite than the larger particle size alumina seed.

EXAMPLE 3

This example illustrates the effect of employing metasilicate as the crystal size growth inhibitor. To a double pass sand milled slurry of C-30 D gibbsite having an APS of about 100 microns was added water, sodium metasilicate, and CP-3 active alumina seeds having an APS of about 30 microns. The solids content in the resulting slurry was about 15 wt. % and the active ingredients as a percentage of solids were 68 wt. % gibbsite, 30 wt. % CP-3 and 2 wt. % metasilicate. After autoclaving for 2 hours at 200° C. the slurry was dried overnight at 138° C. The resulting product was analyzed and the results summarized at Table 1, Run 16. As can be seen therefrom, a high pore volume alumina was obtained with an average pore diameter above 200 Å.

EXAMPLE 4

This example illustrates the effect of co-milling all the active ingredients on morphological properties of product. To 11,446.1 gms $H_2O$ was added 360.0 gms (12.5 wt. %) sodium metal silicate (3.2 molar $SiO_2/NaO_2$) and 83.9 gms of a 50 wt. % sodium hydroxide solution. To the resulting solution was then added 2,410.1 gms H-30 gibbsite and 700 gms AP-15 active alumina available from Porocel. The slurry was double pass milled in a 4 L sand mill until the APS of the gibbsite and active alumina was about 3.0 microns, autoclaved for 2 hours at 200° C., then oven dried overnight at 138° C. The total slurry solids was 15.3 wt. % and the active ingredient content therein as a percent of such solids was 68.18 0.6 wt. % gibbsite, 29.27 wt. % AP-15, 1.95 wt. % $SiO_2$ and 2.6 0.4 wt. % NaOH. The product was identified by X-ray diffraction as boehmite with a 95 Å crystallite size. This example and the morphological properties are described in Table 1B, Run 17.

EXAMPLE 5

This example illustrates separately milling gibbsite without other active ingredients versus co-milling all active ingredients. Thus, for Run 18 a 25 wt. % slurry of ALCOA C-30 type gibbsite was double pass sand milled in a 4 L sand mill until the APS was about 3.0 microns. The resulting sand milled gibbsite was then slurried in water along with CP-3 type active alumina seeds having an APS of 3.0 microns and sodium metasilicate in the amounts reported at Table 1A, Run 18. For Run 19, the same gibbsite starting material employed for Run 18 was admixed with the same active alumina and sodium metasilicate at the same ratios as Run 18 with the exception that the metasilicate content was only about 1 wt. % versus about 2 wt. % for Run 18, and co-milled until the same APS was obtained.

Both slurries were microwaved for 20 minutes at 200° C. in a hermetically sealed reactor, cooled and dried overnight at 138° C. The slurry contents and product analyses are summarized at Tables 1A and B, Runs 18 and 19. In both cases, about 90% conversion of the gibbsite to boehmite was observed in only 20 minutes at 200° C. In spite of the residual gibbsite, the total nitrogen pore volume was well above 1 cc/gm. This example also illustrates that microwave heating can produce a high pore volume boehmite from a milled slurry.

EXAMPLE 6

This example illustrates the effect of employing combinations of crystal size growth inhibitors on the alumina crystallite size and pore volume. Three slurries were prepared containing H-30 gibbsite, and AP-15 active alumina seeds. The identity of the crystal size growth inhibitor was varied among sodium metasilicate, sodium sulfate, and tetrasodium pyrophosphate (TSPP) as reported at Table 1A for Runs 20–22. Each slurry was co-milled using two passes in a 4 L sand mill. Each slurry was autoclaved for 2 hours at 200° C. with stirring at 600 RPM, cooled, and oven dried overnight at 138° C. This Example and the morphological properties of the resulting products are summarized at Tables 1A and B, Runs 20–22. As can be seen therefrom, the crystallite size was significantly reduced by addition of TSPP, the surface area, and total nitrogen pore volume was substantially increased by the addition of TSPP, and the addition of sodium sulfate had no substantial effect on crystallite size but did increase total nitrogen pore volume.

EXAMPLE 7

This example illustrates that a very high average pore diameter boehmite can be produced by autoclaving a co-milled mixture of gibbsite and active alumina with 6% silica as sodium metasilicate. Accordingly, a slurry of gibbsite (H-30), active alumina (AP-15), silica as sodium metasilicate, and tetrasodium pyrophosphate (TSPP) was prepared at about 15 wt. % total solids. This slurry was prepared by dissolving TSPP ($Na_4P_2O_7.10\ H_2O$) in deionized water, adding an aqueous solution of sodium silicate at a $SiO_2/Na_2O$ mole ratio of 3.2, sodium hydroxide solution, AP-15 active alumina and H-30 gibbsite. The composition of the resulting slurry which is autoclaved is summarized at Table 1A, Run 23. All additions were made with agitation using a Cowles Type mixer. The slurry was then milled in a 4 L DRAIS mill with the first pass at about 1.5 L/min and the second pass at about 500 ml/min. The slurry was then autoclaved for 2 hours at 200° C. with agitation at 580 RPM. After cooling the slurry was dried overnight at about 140° C. The sample was exchanged to low soda by reslurrying with an ammonium sulfate (A/S) solution using 1 gm A/S/gm sample for 15 minutes, filtered, water washed and oven dried. The sample was then calcined for 2 hours at 538.7° C. for surface area measurement. The morphological properties of the product are summarized at Table 1B, Run 23. This material was very hydrothermally stable as indicated by a surface area of 154 $m^2/g$ or 83% surface area retention after treatment at 800° C. for 4 hours in a 20% steam atmosphere.

EXAMPLE 8

This example illustrates the effect of using sodium hydroxide as the crystal size growth inhibitor. A 15% solids slurry was prepared with H-30 (gibbsite) and AP-15 (active alumina), and NaOH to yield a slurry characterized at Table 1A, Run 24. The slurry was prepared by adding 162.2 gms of a 50 wt. % NaOH aqueous solution to 7,158 gms water. To the resulting solution was then added under good agitation, 1,258 gms (as is) of H-30 (gibbsite) and 619.9 gms (as is) AP-15 (active alumina). The slurry was co-milled twice in a 4 L DRAIS mill with the first pass at 1.5 L/min and the second at 500 ml/min whereupon the solids content dropped from about 15 wt. % to 11.5 wt. %. The slurry was then autoclaved for 2 hours at 200° C. The morphological properties are summarized at Table 1B, Run 24.

EXAMPLE 9

Example 8 was repeated, except that the level of active alumina in the solids was reduced from 38.18 to 23.6 wt. %. After co-milling and autoclaving as in Example 8, the morphological properties were measured and reported at Table 1B, Run 25. As can be seen from Runs 24 and 25, increasing the crystallite size decreases surface area and reduces pore volume and APD.

EXAMPLE 10

This example illustrates the effect of high seeding levels, and a 3 component CSGI, i.e., sodium metasilicate, NaOH and TSPP, on surface area and pore volume. A slurry with H-30 (gibbsite), AP-15 (active alumina), silicate added as sodium metasilicate, and 0.0065 moles TSPP/mole alumina was prepared by adding 37.7 gms TSPP.10 $H_2O$ to 6,848.1 gms water followed by combining, under rapid agitation, 441.6 gm 12.5 wt. % sodium metasilicate (3.2 molar $SiO_2/Na_2O$), 102.9 gms 50 wt. % NaOH aqueous solution, 1,224.8 gm H-30 and 582.7 gms AP-15. The slurry having solids as reported in Table 1A, Run 26 was double pass milled in accordance with Example 8. The slurry was divided and one portion autoclaved for 2 hours at 200° C., while the other portion was autoclaved for 1 hr at 200° C. Both products were dried overnight at 140° C. The morphological properties of the two products are summarized at Table 1B, Runs 26 and 27, respectively.

EXAMPLE 11

This example illustrates the use of silicate and TSPP as CSGI without caustic. Two slurries were prepared and designated Runs 28 and 29 containing H-30 (gibbsite), AP-15 (active alumina)silicate and TSPP. The contents of each slurry are summarized at Table 1A. However, for Run 28 the mole ratio of TSPP:total alumina was 0.0065 and for Run 29 it was 0.00325. Both slurries were milled in a 4 L DRAIS mill twice with the first pass at 1500 ml/min and the second pass at 500 ml/min. Both slurries were autoclaved for 2 hours at 200° C., cooled and then oven dried overnight at 140° C. Results of the morphological analysis are summarized at Table 1B, Runs 28–29. The sample from Run 28 was tested for hydrothermal stability by heating the same for 4 hours at 800° C. in an atmosphere of 20% steam and the surface area tested and found to be 249 $m^2/g$, which is a retention of 71%.

EXAMPLE 12

This example illustrates the use and effect of TSPP and NaOH as CSGI. This material also has a fairly sharp pore size distribution with an average pore diameter between 150–200 Å. A slurry was prepared with H-30 (gibbsite), AP-15 (active alumina), and sodium hydroxide to give 5.35 wt. % NaOH and 0.02 moles TSPP/mole total alumina. The slurry was prepared by dissolving 120.7 gm tetrasodium pyrophosphate (TSPP) in 7,034.7 g of water, adding 164.2 gm 50 wt. % aqueous sodium hydroxide solution, 613.3 gm AP-15 and 1,267 gm H-30. All additions were made under Cowles agitation. The slurry was co-milled in a DRAIS mill with the first pass at 1500 ml/min and the second pass at 500 ml/min. The slurry was then autoclaved for 2 hours at 200° ml/min. The slurry was then autoclaved for 2 hours at 200° C., cooled and oven dried overnight at 140° C. Results of the morphological analysis are summarized at Table 1A, Run 30.

EXAMPLE 13

This example illustrates the effect of addition of NaOH and of Laponite™, a synthetic hectorite manufactured by Laporte Industries as the CSGI's. Two slurries (Runs 31 and 32) sand milled in accordance with Example 8 were prepared from C30D gibbsite, Alcoa CP-3 active alumina, and $SiO_2$ from 3.22 molar $SiO_2/Na_2O$ with caustic addition to a $Na_2O/SiO_2$ molar ratio of 2.0. Separately, a Laponite clay was fully dispersed for ½ hour in water prior to addition of the milled slurry for Run 32 thereto. After autoclaving both slurries for two hours at 200° C., the products were dried overnight at 138° C. The contents of the slurry which was autoclaved are summarized at Table 1A and results of the morphological analysis are reported at Table 1B, Runs 31 and 32. As can be seen therefrom the Laponite decreased crystallite size, substantially increased surface area, and substantially increased total nitrogen pore volume.

EXAMPLE 14

This example compares the same slurry autoclaved with/without Laponite RDS™. Note that Laponite RDS contained a phosphate additive (such that the $P_2O_5/Al_2O_3$ mole ratio in the final slurry was 0.018) so it can be dispersed at a higher concentration in water. To a first double pass sand milled slurry of gibbsite was added water, CP-3 active alumina as seeds, sodium silicate and sodium hydroxide having an $SiO_2/Na_2O$ molar ratio of 3.2 and the resulting slurry designated Run 33. Run 33 was repeated and the resulting slurry designated Run 34, except that a well dispersed slurry of Laponite RDS™ (a physical blend of Laponite RD™ and TSPP having the composition 6.7 wt. % $Na_2O$; 26.7 wt. % MgO, 1.9 wt. % $SO_4$, 4.5 wt. % $P_2O_5$, 0.76 wt. % $LiO_2$, 59 wt. % $SiO_2$ and ATV of 13.77 wt. %) was added to the slurry of Run 34 such that the final slurry contained 5 wt. % Laponite RDS™ based on the solids weight. Both slurries were autoclaved for 2 hours at 200° C. with stirring at 600 RPM. The composition of 1he slurries prior to autoclaving is summarized at Table 1A, Runs 33 and 34. After cooling, the slurries were oven dried overnight at 138° C. The morphological properties thereof are summarized at Table 1B, Runs 33 and 34. As can be seen therefrom, the addition of the Laponite RDS™ gave a boehmite with a higher nitrogen pore volume, smaller crystallite size, higher surface area and substantially increased total pore volume.

EXAMPLE 15

This example illustrates the effect of addition of a small amount of tetrasodium pyrophosphate (TSPP) on the crystallite size and pore volume of an autoclaved alumina product made with Laponite™. Two identical slurries were prepared and designated Runs 35 and 36, respectively, except to one (Run 36) was added 0.00234 moles TSPP/mole alumina. The slurries were prepared by dispersing 3.0 gms of Laponite RD™ (a swellable clay characterized as containing 59–60 wt. % $SiO_2$, 27–29 wt. % MgO, 07–0.9 wt. % LiO and 2.2–3.5 wt. % $Na_2O$) in 596.6 gm $H_2O$. Then TSPP was added to the Laponite™ slurry of Run 36 and not the slurry of Run 35. To each Laponite™ slurry was then added 14.4 gms of sodium silicate solution (12.5 wt. % $SiO_2$, $SiO_2/Na_2O$ molar ratio=3.2) and 8.1 gms 50 wt. % aqueous NaOH solution. Then 522.8 gms of double pass sand milled gibbsite (H-30 from Kaiser, total volatiles (TV)=75.9 wt. %) was added to each slurry along with 55.1 gms CP-3 active alumina (TV=10.0 wt. %). Both slurries were autoclaved for 2 hours at 200° C., and the alumina product dried at 138° C. overnight. The composition of the slurry which was autoclaved is summarized at Table 1A, and the results of morphological analysis are provided at Table 1, Runs 35 and 36. As can be seen therefrom, addition of a small amount of the phosphate salt substantially reduced crystallite size and increased pore volume.

EXAMPLE 16

This example illustrates the effect of co-milling all the raw materials together instead of just the gibbsite on the autoclaved boehmite properties in a Laponite™ containing system. Two slurries were prepared, designated Runs 37 and 38, containing about 68 wt. % gibbsite, about 27 wt. % AP-15 (active alumina), about 2 wt. % $SiO_2$ ($Na_2O/SiO_2$ molar ratio=1.0) and about 3 wt. % Laponite™ as depicted at Table 1A. For Run 37, only the gibbsite was sand milled as a slurry while for Run 38 the entire autoclave input slurry was co-milled. Both were double pass milled with the first pass mild and the second severe. The morphological analysis is provided at Table 1B Runs 37 and 38. As can be seen therefrom, co-milling significantly reduced crystallite size of the boehmite and increased nitrogen pore volume.

As with all surface area and pore property determinations, such properties as reported at Runs 37 and 38 were obtained after calcination at 537.8° C. for 2 hours. However, a portion of the uncalcined sample of Run 38 was calcined for 4 hours at 800° C. in an atmosphere of 15 wt. % steam and the morphological properties thereafter determined and reported as Run 39 at Table 1B. Among the noteworthy features of the pore size distribution of the Product of Runs 38 and 39 are very little pore volume in <100 Å pores, a mesopore pore mode at about 250 Å, and excellent hydrothermal stability, with 95% surface area retention after steaming.

EXAMPLE 17

This example illustrates the effect of Laponite™ on two different co-milled slurries prepared with 0 and 5 wt. % Laponite™ and designated Runs 40 and 41, respectively. Inputs and product analysis after autoclaving for 2 hours at 200° C. and then drying overnight are summarized at Table 1A. Thus, the co-milling procedure was the same as employed for Example 16 and the contents of the slurries is summarized at Table 1A, Runs 40 and 41. The addition of the 5 wt. % Laponite™ gave an alumina with smaller crystallites, higher surface area and much higher pore volume than the sample autoclaved without Laponite™. A nitrogen pore size distribution of the boehmite with 5% Laponite™ added (Run 41) confirms a high proportion of the pore diameter between 300 and 1000 Å with a macropore pore mode at 780 Å.

EXAMPLE 18

This example illustrates the effect of milling to obtain very high pore volumes. Thus, Run 41 was repeated two times (and designated Runs 42 and 43) except that the co-milling was varied by controlling the number of passes through the sand mill. The particle size of the starting gibbsite was also varied. More specifically, Runs 42 to 43 employed 1 and 0 passes through the sand mill respectively. The starting gibbsite particle size prior to co-milling was 8 microns for Runs 42 and 43 versus 100 microns for Run 41. The 8 micron particle size was obtained by premilling the gibbsite. All milled slurries were milled with all ingredients present. The input levels and results are summarized at Tables 1A and B Runs 42 and 43. As can be seen from comparing Runs 41 to 43, the pore volume increases and crystallite size decreases with milling severity. Nitrogen pore size distributions confirm this increase in pore volume as milling severity increases.

EXAMPLE 19

This example illustrates the effect of using TSPP as a CSGI at varying amounts. Thus, three identical slurries (designated Runs 44 to 46) containing gibbsite, active alumina, active alumina seeds (AP-15), sodium silicate, sodium hydroxide and Laponite™ in amounts as reported at Table 1A, Runs 44 to 46, were prepared. Also added to the slurries was tetrasodium pyrophosphate (TSPP) at amounts of 0.0, 0.00256 or 0.00511 moles TSPP per mole $Al_2O_3$ respectively for Runs 44 to 46. All slurries were double pass sand milled after all ingredients were added and then autoclaved for 2 hours at 200° C with 600 RPM agitation. Each product was oven dried overnight at 138° C. The results of morphological analysis are summarized at Table 1B, Runs 44 to 46. As can be seen therefrom, addition of the TSPP did reduce the crystallite size and increase pore volume of the boehmite alumina. It will be observed, however, that if the amount of TSPP is too high as in Run 46, it will inhibit the gibbsite to boehmite conversion. Accordingly, Run 46 is viewed as Comparative Example 3. High levels of TSPP can be used without inhibiting gibbsite conversion by changing reaction conditions, e.g., reducing silicate or increasing alumina seeding level.

EXAMPLE 20

This example illustrates the effect of using the natural clay Polargel® T (a mixture of about 10 wt. % natural hectorite and about 90 wt. % montmorillonite clays) from the American Colloid Co. as a CSGI. Polargel® can be characterized as containing 2.35 wt. % $Na_2O$, 14.43 wt. % $Al_2O_3$, 75.35 wt. % $SiO_2$, 3.11 wt. % MgO, 1.78 wt. % CaO, 0.84 wt. % $K_2O$, and 0.067 wt % $Li_2O$ and TV at 954° C. of 11.68 wt. %. Two slurries, designated Runs 47 and 48, were prepared with 1,627.4 gm H-30 gibbsite, 469.2 gm AP-15 active alumina, 250.2 gm (12.5% $SiO_2$) sodium silicate ($SiO_2$/$Na_2O$ molar ratio=3.2), 58.3 gms 50% NaOH solution and 6,741 gms $H_2O$. The slurry of Run 47 contained 1 gm Laponite™ RD (TV=13.26 wt. %), and the slurry for Run 48 contained 54.1 0.1 gms Polargel® T (TV=11.68 wt. %). Each slurry was prepared by dispersing the respective clay in water for ½ hour with rapid agitation. To each dispersion was then added the silicate and caustic and then the active alumina and gibbsite. Both slurries were double pass milled in a 4 L sand mill, autoclaved for 2 hours at 200° C., cooled, and oven dried overnight at 138° C. The results of the morphological analysis are provided at Table 1B, Runs 47 and 48. As can be seen therefrom, similar high pore volume aluminas were prepared with the synthetic hectorite or the blended natural clay.

EXAMPLE 21

This example illustrates the effect of not milling gibbsite in a TSPP/Laponite™ containing system and varying the amount of TSPP. Three slurries were prepared, designated Runs 49–51, using 190.1 gms gibbsite (uncalcined AP-15 from Porocel), 50.0 gms AP-15 active alumina, 14.4 gms (12.5%) sodium silicate (3.2 $SiO_2/Na_2O$), 3.4 gms 50% sodium hydroxide, 10.4 gms Laponite RD™ and 0.00256, and 0.0039 moles TSPP/mole of alumina for Runs 49–51, respectively. All slurries were mixed, autoclaved for 2 hours at 200° C., and oven dried overnight at 138° C. The morphological analytical results are reported at Table 1B, Runs 49–51. As can be seen therefrom, a moderately high pore volume alumina can be produced without TSPP and without milling, and addition of TSPP reduces crystallite size and farther increases pore volume.

EXAMPLE 22

This example illustrates the effect of conducting the hydrothermal treatment with microwave radiation. To 54.9 gm $H_2O$ was added 0.87 gm Laponite RD™ and stirred for ½ hour to disperse the clay. Then 1.2 gm of 12.5% $SiO_2$ solution ($SiO_2/Na_2O$ molar ratio=3.2) was added to the dispersion along with 0.28 gms 50% sodium hydroxide solution. Then 4.2 gms CP-3 active alumina and 42.8 gms of double pass sand milled H-30 gibbsite prepared at about 25% solids were added and the slurry microwaved in a hermetically sealed container for 20 minutes at 200° C. After cooling, the slurry was dried overnight at 138° C. The morphological analytical results are summarized at Table 1B, Run 52. It will be observed that in spite of the less than 100% conversion to boehmite, the total nitrogen pore volume is above 1 cc/gm.

| | | | | | | | | | | | |
|---|---|---|---|---|---|---|---|---|---|---|---|
| | | | | | | Col. Nos. | | | | | |
| | 1 | 2 | 3 | 4 | 5 | 6 | 7 | | 9 | 10 | 11 |
| | | | | Slurry Properties | | | | | | | |
| | | | Gibbsite | | | | | | Autoclave | | |
| | | Total Slurry Solids | APS Microns As used, | | | Alumina Seeds | | CSGI Comp. | Total CSGI | | |
| Ex or | | (Wt. % | or if | | Wt. % | | Wt. % | Wt. % of | as wt. % of | Conditions | |
| RUN No. | Comp Ex No | of Slurry) | Source* | miled, after miling | of Solids | Source | APS Microns | of Solids | Col. 1 Total Solids | Solids Of Col. 1 | Temp (° C.) | Time (Min.) |
| 1 | C. Ex1 | 15 | Superfine | 11 | 100 | N/A | N/A | 0 | N/A | 0 | 200 | 60 |
| 2 | C. Ex 1 | 15 | Superfine | 7 | 100 | N/A | N/A | 0 | N/A | 0 | 200 | 60 |
| 3 | C. Ex. 1 | 15 | Superfine | 4 | 100 | N/A | N/A | 0 | N/A | 0 | 200 | 60 |
| 4 | C. Ex. 1 | 15 | HYDRAL 710 | 4 | 100 | N/A | N/A | 0 | N/A | 0 | 200 | 60 |
| 5 | C. Ex. 1 | 15 | FRF85 | 7 | 100 | N/A | N/A | 0 | N/A | 0 | 200 | 60 |
| 6 | C. Ex. 2 | 20 | C30D | N/A | 100 | Boehmite | N/A | 0 | N/A | 0 | 200 | 60 |
| 7 | C. Ex. 2 | 20 | C30D | N/A | 90 | Boehmite | N/A | 10 | N/A | 0 | 200 | 30 |
| 8 | C. Ex. 2 | 20 | C30D | N/A | 80 | Boehmite | N/A | 20 | N/A | 0 | 200 | 30 |
| 9 | C. Ex. 2 | 20 | C30D | N/A | 70 | Boehmite | N/A | 30 | N/A | 0 | 200 | 30 |
| 10 | Ex. 1 | 15 | M(C30D) | N/A | 76.9 | Active Alumina | N/A | 19.5 | $SiO_2$ = 0.97<br>NaOH = 2.6 | 3.60 | 200 | 60 |
| 11 | Ex. 1 | 15 | M(C30D) | N/A | 76.1 | Active Alumina | N/A | 19.27 | $SiO_2$ = 0.96<br>NaOH = 3.67 | 4.63 | 200 | 60 |
| 12 | Ex. 1 | 15 | M(C30D) | N/A | 66.2 | Active Alumina | N/A | 29.2 | $SiO_2$ = 1.95<br>NaOH = 2.6 | 4.55 | 200 | 120 |
| 13 | Ex. 1 | 16 | M(C30D) | N/A | 66.36 | Active Alumina | N/A | 29.41 | $SiO_2$ = 1.16<br>NaOH = 3.08 | 4.24 | 200 | 60 |
| 14 | Ex. 2 | 15 | M(RH30) | N/A | 66 | CP-13 | 3 | 29.1 | $SiO_2$ = 2.1<br>NaOH = 2.78 | 4.68 | 200 | 120 |
| 15 | Ex. 2 | 15 | M(RH30) | N/A | 66.2 | AP-15 | 8 | 29.2 | $SiO_2$ = 1.95<br>NaOH = 2.6 | 4.55 | 200 | 120 |
| 16 | Ex. 3 | 15 | M(C30D) | N/A | 66 | CP-13 | N/A | 29.1 | $SiO_2$ = 2.1<br>NaOH = 2.8 | 4.90 | 200 | 120 |
| 17 | Ex. 4 | 15.3 | CM(H-30) | N/A | 68.18 | CM(AP-15) | N/A | 27.27 | $SiO_2$ = 1.95<br>NaOH = 2.6 | 4.55 | 200 | 120 |
| 18 | Ex. 5 | 15.1 | M(C30D) | N/A | 66.2 | | N/A | 27.3 | $SiO_2$ = 1.93<br>NaOH = 2.58 | 4.51 | 200 | 20 |
| 19 | Ex. 5 | 15.2 | CM(H30) | N/A | 69.08 | | N/A | 28.62 | $SiO_2$ = 0.99<br>NaOH = 1.31 | 2.30 | 200 | 20 |
| 20 | Ex. 6 | 15.5 | CM(N-30) | 0.6 | 67.75 | CM(AP-15) | N/A | 27.1 | $SiO_2$ = 1.94<br>NaOH = 2.58<br>TSPP = 0.63 | 4.53 | 200 | 120 |
| 21 | Ex. 6 | 15.4 | CM(H-30) | 2.8 | 67.84 | CM(AP-15) | N/A | 27.13 | $SiO_2$ = 1.94<br>NaOH = 2.58<br>$Na_2SO_4$ = 0.51 | 5.03 | 200 | 120 |
| 22 | Ex. 6 | 15.4 | CM(H-30) | 3.0 | 68.18 | CM(AP-15) | N/A | 27.27 | $SiO_2$ = 1.95<br>NaOH = 2.6 | 4.55 | 200 | 120 |
| 23 | Ex. 7 | 16.4 | CM(H-30) | 9.0 | 51.1 | CM(AP-15) | N/A | 34.68 | $SiO_2$ = 5.48<br>NaOH = 7.3<br>TSPP = 1.45 | 14.23<br>5.55<br>5.55 | 200<br>200<br>200 | 120<br>120<br>120 |
| 24 | Ex. 8 | 15.9 | CM(H-30) | N/A | 56.26 | CM(AP-15) | N/A | 38.18 | NaOH = 5.55 | | | |
| 25 | Ex. 9 | 15.9 | CM(H-30) | N/A | 70.8 | CM(AP-15) | N/A | 23.6 | NaOH = 5.55 | | | |
| 26 | Ex. 10 | 15.8 | CM(H-30) | N/A | 54.24 | CM(AP-15) | N/A | 35.52 | $SiO_2$ = 3.74<br>NaOH = 4.98<br>TSPP = 1.52 | 10.24 | 200 | 120 |
| 27 | Ex. 10 | 15.8 | CM(H-30) | N/A | 54.24 | CM(AP-15) | N/A | 35.52 | $SiO_2$ = 3.74<br>TSPP = 1.52<br>NaOH = 4.98 | 10.24 | 200 | 60 |
| 28 | Ex. 11 | 15.4 | CM(H-30) | N/A | 56.18 | CM(AP-15) | N/A | 36.81 | $SiO_2$ 3.87<br>TSPP = 1.58<br>NaOH = 1.55 | 7.00 | 200 | 120 |

-continued

| | | | Col. Nos. | | | | | | | |
|---|---|---|---|---|---|---|---|---|---|---|
| | 1 | 2 | 3 | 4 | 5 | 6 | 7 | 9 | 10 | 11 |
| | | | | Slurry Properties | | | | | | |
| | | | Gibbsite | | | | | Autoclave | | |
| | | Total Slurry Solids | | APS Microns As used, | | Alumina Seeds | | CSGI Comp. | Total CSGI as wt. % of | Conditions |
| RUN No. | Ex or Comp Ex No | (Wt. % of Slurry) | Source* | or if miled, after miling | Wt. % of Solids | Source | APS Microns | Wt. % of Solids | Wt. % of Col. 1 Total Solids | Solids Of Col. 1 | Temp (° C.) | Time (Min.) |
|---|---|---|---|---|---|---|---|---|---|---|---|---|
| 29 | Ex. 11 | 15.4 | CM(H-30) | N/A | 56.63 | CM(AP-15) | N/A | 37.1 | SiO$_2$ = 3.91<br>TSPP = 0.79<br>NaOH = 1.57 | 6.27 | 200 | 120 |
| 30 | Ex. 12 | 16.7 | CM(H-30) | N/A | 54 | CM(AP-15) | N/A | 36.0 | TSPP = 4.7<br>NaOH = 5.35 | 10.05 | 200 | 120 |
| 31 | Ex. 13 | 15.8 | CM(C30D) | N/A | 64.55 | CM(CP-3) | N/A | 26.48 | NaOH = 5.06<br>SiO$_2$ = 1.9<br>Laponite = 0 | 6.96 | 200 | 120 |
| 32 | Ex. 13 | 15.8 | CM(C30D) | N/A | 64.26 | CM(CP-3) | N/A | 28.35 | NaOH = 5.04<br>SiO$_2$ = 1.9<br>Laponite = 0.45 | 7.39 | 200 | 120 |
| 33 | Ex. 14 | 15.4 | M(Mural 932) | N/A | 66.26 | CP-3 | N/A | 29.2 | SiO$_2$ = 1.95<br>NaOH = 2.6<br>Laponite RDS = 0 | 4.55 | 200 | 120 |
| 34 | Ex. 14 | 15.4 | M(Mural 932) | N/A | 60.60 | CP-3 | N/A | 26.74 | SiO$_2$ = 1.78<br>NaOH = 2.34<br>Laponite RDS = 4.45<br>TSPP = 4.1 | 12.67 | 200 | 120 |
| 35 | Ex. 15 | 15.4 | M(H-30) | N/A | 68.2 | CP-3 | N/A | 26.8 | SiO$_2$ = 0.97<br>NaOH = 2.6<br>TSSP = 0<br>Laponite = 1.41 | 5.00 | 200 | 120 |
| 36 | Ex. 15 | 15.4 | M(H-30) | N/A | 67.8 | CP-3 | N/A | 26.7 | SiO$_2$ = 0.97<br>NaOH = 2.6<br>TSPP = 0.58<br>Laponite = 1.4 | 5.55 | 200 | 120 |
| 37 | Ex. 16 | 15.4 | M(H30) | N/A | 66.2 | AP-15 | N/A | 26.3 | SiO$_2$ = 1.95<br>NaOH = 2.57<br>Laponite = 2.9 | 7.44 | 200 | 120 |
| 38 | Ex. 16 | 15.4 | CM(H30)) | N/A | 66.2 | CM(AP-15) | N/A | 28.3 | SiO$_2$ = 1.95<br>NaOH = 2.59<br>TSPP = 2.9 | 7.44 | 200 | 120 |
| 39 | Ex. 16 (aged) | 17.5 | CM(H30) | N/A | 66.2 | CM(AP-15) | N/A | 26.3 | SiO$_2$ = 1.95<br>NaOH = 2.6<br>Laponite = 2.9 | 7.44 | 200 | 120 |
| 40 | Ex. 17 | 15.2 | CM(H30) | N/A | 69.1 | CM(AP-15) | N/A | 28.6 | SiO$_2$ = 0.99<br>NaOH = 1.31<br>Laponite = 0 | 2.30 | 200 | 120 |
| 41 | Ex. 17 | 15.2 | CM(H30) | N/A | 68.1 | CM(AP-15) | N/A | 24.7 | SiO$_2$ = 0.99<br>NaOH = 1.3<br>Laponite = 4.9 | 7.19 | 200 | 120 |
| 42 | Ex. 18 | 15.2 | AP-15 Pre-Cursor | N/A | 68.1 | CM(AP-15) | N/A | 24.7 | SiO$_2$ = 1.0<br>NaOH = 1.3<br>Laponite = 4.9 | 7.20 | 200 | 120 |
| 43 | Ex. 18 | 15.2 | AP-15 Pre-Cursor | N/A | 68.1 | AP-15 | N/A | 24.7 | SiO$_2$ = 1.0<br>NaOH = 1.3<br>Laponite = 4.9 | 7.20 | 200 | 120 |
| 44 | Ex. 19 | 15.2 | CM(H-30) | N/A | 68.1 | CM(AP-15) | N/A | 24.7 | SiO$_2$ = 1.0<br>NaOH = 1.3<br>TSPP = 0<br>Laponite = 4.9 | 7.20 | 200 | 120 |
| 45 | Ex. 19 | 15.3 | CM(H-30) | N/A | 67.6 | CM(AP-15) | N/A | 24.5 | SiO$_2$ = 1.0<br>NaOH = 1.3<br>TSPP = 0.6<br>Laponite = 4.95 | 7.90 | 200 | 120 |

-continued

| | | | | | Slurry Properties | | | | | | |
|---|---|---|---|---|---|---|---|---|---|---|---|
| | | Col. Nos. | | | | | | | | | |
| | | 1 | 2 | 3 | 4 | 5 | 6 | 7 | 9 | 10 | 11 |
| | | | | Gibbsite | | | Alumina Seeds | | Autoclave | | |
| | | | | | | | | | CSGI | | |
| | | Total Slurry Solids | | APS Microns As used, or if miled, after | | | | | Comp. | Total CSGI | Conditions |
| RUN No. | Ex or Comp Ex No | (Wt. % of Slurry) | Source* | miling | Wt. % of Solids | Source | APS Microns | Wt. % of Solids | Wt. % of Col. 1 Total Solids | as wt. % of Solids Of Col. 1 | Temp (° C.) | Time (Min.) |
| 46 | C.Ex. 3 | 15.4 | CM(H-30) | N/A | 67.2 | CM(AP-15) | N/A | 24.4 | $SiO_2$ = 0.97<br>NaOH = 1.3<br>TSPP = 1.2<br>Laponite = 4.9 | 8.37 | 200 | 120 |
| 47 | Ex. 20 | 17.5 | CM(H30) | N/A | 66.2 | CM(AP-15) | N/A | 26.3 | $SiO_2$ = 1.96<br>NaOH = 2.6<br>Laponite = 2.9 | 7.45 | 200 | 120 |
| 48 | Ex. 20 | 17.5 | CM(H30) | N/A | 66.2 | CM(AP-15) | N/A | 26.3 | $SiO_2$ = 1.95<br>NaOH = 2.6<br>Polargel T = 2.9 | 7.45 | 200 | 120 |
| 49 | Ex. 21 | 15.2 | AP-15 Pre-Cursor | N/A | 68.1 | AP-15 | N/A | 24.7 | $SiO_2$ = 1.0<br>NaOH = 1.3<br>TSPP = 0<br>Laponite RD = 4.9 | 7.20 | 200 | 120 |
| 50 | Ex. 21 | 15.3 | AP-15 Pre-Cursor | N/A | 67.1 | AP-15 | N/A | 24.5 | $SiO_2$ = 0.98<br>NaOH = 1.3<br>TSPP = 0.62<br>Laponite RD = 4.9 | 7.60 | 200 | 120 |
| 51 | Ex. 21 | 5.3 | AP-15 Pre-Cursor | N/A | 68.3 | AP-15 | N/A | 24.8 | $SiO_2$ = 0.99<br>TSPP = 0.95<br>Laponite RD = 4.95 | 6.90 | 200 | 120 |
| 52 | Ex. 22 | 14.9 | M(H30) | N/A | 68.1 | AP-15 | N/A | 24.7 | $SiO_2$ = 0.99<br>NaOH = 1.3<br>Laponite = 4.9 | 7.20 | 200 | 20 |

*CM = Co-Milled
*M = Milled
CSGI = Crystal Size Growth Inhibitor
N/A = Not available or not applicable.

TABLE 1B

| | | | | | | | | |
|---|---|---|---|---|---|---|---|---|
| | | Col. Nos. | | | | | | |
| | | 1 | 2 | 3 | 4 | 5 | 6 | 7 | 8 |
| | | | | | | Product Properties | | | |
| RUN NO. | Ex or Comp Ex No | XRD Signature | Boehmite Wt % | Boehmite Crystallite Size (Å) | SA ($m^2$/g) | $N_2$PV (0.967 = P/P$^0$) (cc/gm) | APD (0.967 = P/P$^0$) (Å) | $N_2$PV (0.995 = P/P$^0$) (cc/gm) | APD (0.995 = P/P$^0$) (Å) |
| 1 | C. Ex 1 | Boehmite | 100 | 512 | 120 | 0.09 | 30 | 0.13 | 43 |
| 2 | C. Ex 1 | Boehmite | 100 | 670 | 112 | 0.09 | 32 | 0.15 | 54 |
| 3 | C. Ex 1 | Boehmite | 100 | 661 | 116 | 0.09 | 31 | 0.1 | 34 |
| 4 | C. Ex. 1 | Boehmite | 100 | 518 | 113 | 0.08 | 28 | 0.08 | 28 |
| 5 | C. Ex. 1 | Boehmite | 100 | 510 | 115 | 0.08 | 28 | 0.09 | 31 |
| 6 | C. Ex. 2 | Boehmite | 100 | 565 | 105 | 0.08 | 30 | N/A | N/A |
| 7 | C. Ex. 2 | Boehmite | 100 | 479 | 122 | 0.17 | 56 | N/A | N/A |
| 8 | C. Ex. 2 | Boehmite | 100 | 430 | 132 | 0.24 | 73 | N/A | N/A |
| 9 | C. Ex. 2 | Boehmite | 100 | 430 | 128 | 0.20 | 63 | N/A | N/A |
| 10 | Ex. 1 | Boehmite | 100 | 465 | 95 | 0.09 | 38 | 0.36 | 152 |
| 11 | Ex. 1 | Boehmite | 100 | 506 | 105 | 0.11 | 43 | 0.14 | 53 |
| 12 | Ex. 1 | Boehmite | 100 | 186 | 145 | 0.68 | 188 | 1.05 | 290 |
| 13 | Ex. 1 | Boehmite | 100 | 161 | 136 | 0.78 | 229 | 1.02 | 300 |
| 14 | Ex. 2 | Boehmite | 100 | 136 | 173 | 0.92 | 213 | 1.45 | 335 |

TABLE 1B-continued

|  |  |  |  |  | Col. Nos. |  |  |  |
|---|---|---|---|---|---|---|---|---|
|  | 1 | 2 | 3 | 4 | 5 | 6 | 7 | 8 |
|  |  |  |  |  | Product Properties | | | |
| RUN NO. | Ex or Comp Ex No | XRD Signature | Boehmite Wt % | Boehmite Crystallite Size (Å) | SA (m²/g) | $N_2PV$ (0.967 = $P/P^0$) (cc/gm) | APD (0.967 = $P/P^0$) (Å) | $N_2PV$ (0.995 = $P/P^0$) (cc/gm) | APD (0.995 = $P/P^0$) (Å) |
| 15 | Ex. 2 | Boehmite | 100 | 341 | 145 | 0.57 | 157 | 0.84 | 232 |
| 16 | Ex. 3 | Boehmite | 100 |  | 160 | 0.75 | 188 | 1.05 | 264 |
| 17 | Ex. 4 | Boehmite | 100 | 95 | 211 | 1.14 | 215 | 1.31 | 249 |
| 18 | Ex. 5 | Boehmite | 90 | 118 | 216 | 0.71 | 138 | 1.16 | 225 |
| 19 | Ex. 5 | Boehmite/ Gibbsite | 90 | 121 | 212 | 0.85 | 160 | 1.26 | 238 |
| 20 | Ex. 6 | Boehmite | 100 | 59 | 295 | 1.3 | 177 | 1.67 | 227 |
| 21 | Ex. 6 | Boehmite | 100 | 103 | 228 | 1.26 | 220 | 1.60 | 281 |
| 22 | Ex. 6 | Boehmite | 100 | 95 | 211 | 1.14 | 215 | 1.31 | 249 |
| 23 | Ex. 7 | Boehmite | 100 | 88 | 185 | N/A | N/A | 2.23 | 483 |
| 24 | Ex. 8 | Boehmite | 100 | 149 | 165 | 1.97 | 478 | N/A | N/A |
| 25 | Ex. 9 | Boehmite | 100 | 320 | 118 | N/A | N/A | 0.40 | 136 |
| 26 | Ex. 10 | Boehmite | 100 | 47 | 344 | N/A | N/A | 1.56 | 181 |
| 27 | Ex. 10 | Boehmite | 100 | 46 | 351 | N/A | N/A | 1.55 | 177 |
| 28 | Ex. 11 | Boehmite | 100 | 46 | 349 | 1.60 | 183 | 1.99 | 228 |
| 29 | Ex. 11 | Boehmite | 100 | 52 | 324 | 1.52 | 188 | 2.03 | 250 |
| 30 | Ex. 12 | Boehmite | 100 | 48 | 267 | N/A | N/A | 1.12 | 168 |
| 31 | Ex. 13 | Boehmite | 100 | 178 | 138 | N/A | N/A | 0.92 | 267 |
| 32 | Ex. 13 | Boehmite | 100 | 141 | 315 | N/A | N/A | 1.479 | 188 |
| 33 | Ex. 14 | Boehmite | 100 | 166 | 159 | 0.529 | 133 | 0.674 | 169 |
| 34 | Ex. 14 | Boehmite | 100 | 98 | 231 | 1.121 | 194 | 1.336 | 232 |
| 35 | Ex. 15 | Boehmite | 100 | 155 | 169 | 0.657 | 155 | 0.839 | 198 |
| 36 | Ex. 15 | Boehmite | 100 | 106 | 205 | 0.861 | 168 | 0.065 | 208 |
| 37 | Ex. 16 | Boehmite | 100 | 195 | 173 | 0.512 | 118 | 0.984 | 219 |
| 38 | Ex. 16 | Boehmite | 100 | 87 | 211 | 1.3 | 247 | 1.5* | 284* |
| 39 | Ex. 16 (aged) | Boehmite | 100 | 87 | 195 | 1.24 | 255 | 1.5* | 307* |
| 40 | Ex. 17 | Boehmite | 100 | 190 | 143 | 0.57 | 160 | 1.14* | 317* |
| 41 | Ex. 17 | Boehmite | 100 | 92 | 215 | 1.21 | 225 | 2.16* | 403* |
| 42 | Ex. 18 | Boehmite | 100 | 113 | 167 | 0.81 | 194 | 1.29* | 310* |
| 43 | Ex. 18 | Boehmite | 100 | 142 | 191 | 0.85 | 177 | 1.15* | 241* |
| 44 | Ex. 19 | Boehmite | 100 | 89 | 240 | 1.35 | 225 | 1.78 | 296 |
| 45 | Ex. 19 | Boehmite | 100 | 63 | 283 | 1.63 | 230 | 2.23 | 315 |
| 46 | C. Ex. 3 | Gibbsite | 0 | N/A | 258 | 0.36 | 56 | 0.47 | 72 |
| 47 | Ex. 20 | Boehmite | 100 | 104 | 195 | 1.11 | 227 | 1.39 | 285 |
| 48 | Ex. 20 | Boehmite | 100 | 82 | 223 | 1.14 | 205 | 1.43 | 257 |
| 49 | Ex. 21 | Boehmite | 100 | 142 | 191 | 0.85 | 177 | 1.15 | 241 |
| 50 | Ex. 21 | Boehmite | 100 | 123 | 197 | 1.012 | 205 | 1.227 | 249 |
| 51 | Ex. 21 | Boehmite | 100 | 100 | 201 | 1.251 | 249 | 1.365 | 272 |
| 52 | Ex. 22 | Boehmite | 90 | 116 | 227 | 0.66 | 116 | 1.03 | 181 |

* = $P/P^0$ = 0.993

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. Porous composite particles comprising an aluminum oxide component and at least one additive component residue of a crystal size growth inhibitor dispersed within the aluminum oxide component, wherein said composite particles have:

(A) a specific surface area of at least about 80 m²/g;

(B) an average nitrogen pore diameter of from about 60 to about 1,000 Angstroms;

(C) a total nitrogen pore volume of from about 0.2 to about 2.5 cc/g; and (D) an average particle diameter of from about 1 to about 15 microns.

and wherein in said composite particles:

(i) the alumina oxide component comprises at least 70 wt. % (a) crystalline boehmite having an average crystallite size of from about 20 to about 200 Angstroms; (b) gamma alumina derived from said crystalline boehmite; or (c) mixtures thereof;

(ii) the additive component residue is derived from at least one ionic compound having a cation and an anion wherein the cation is selected from the group of ammonium, alkali metal cation, and alkaline earth metal cation and mixtures thereof and the anion is selected from the group of hydroxyl, silicate, phosphate, sulfate and mixtures thereof, and is present in the composite particles at an amount of from about 0.5 to about 10 wt. %, based on the combined weight of the aluminum oxide component, and additive component residue.

2. The porous composite particles of claim 1 wherein the aluminum oxide component is derived from a mixture of gibbsite and active alumina.

3. The porous composite particles of claim 1 wherein the additive component residue is derived from a mixture of at least one silicate and at least one hydroxide.

4. The porous composite particles of claim 2 wherein the added component residue is derived from a mixture of at least one silicate and at least one phosphate.

5. The porous composite particles of claim 1 wherein the nitrogen pore volume is characterized as having:
 (i) a macropore content of not greater than about 75% of the total pore volume;
 (ii) a mesopore content of from about 15 to about 90% of the total nitrogen pore volume and wherein at least about 20% of the pores in the mesopore region have a diameter of from about 100 to about 400 Angstroms; and
 (iii) a micropore content of not greater than about 80% of the total nitrogen pore volume.

6. The porous composite particles of claim 2 wherein the additive component residue is derived from a mixture of at least one silicate, at least one phosphate and at least one swellable clay.

7. The porous composite particles of any one of claims 2 to 6 wherein the additive component residue is present therein at from about 0.5 to about 5 wt. % based on the weight of the aluminum oxide component and additive component residue in the composite particles.

8. The porous composite particles of claim 2 wherein the average crystallite size of the boehmite present therein is from about 30 to about 150 Angstroms.

9. The porous composite particles of claim 8 wherein the surface area is from about 150 to about 450 $m^2/g$, the total nitrogen pore volume is from about 0.5 to about 2.4 cc/g, and the average pore diameter is from about 80 to about 500 Angstroms.

10. Porous composite of claim 2 wherein the additive component residue comprises at least one member derived from the group of ammonium sulfate, ammonium phosphate, alkali metal silicate, dialkali metal silicate, tetra alkali metal silicate, dialkali metal phosphate, alkali metal polyphosphate, and alkali metal sulfate.

11. A process for making porous composite particles having a surface area of at least 80 $m^2/g$, a total nitrogen pore volume of from about 0.2 to about 2.5 cc/g, and an average pore diameter of from about 60 to about 1,000 Angstroms comprising:
 (A) admixing (i) alumina trihydrate, (ii) liquid medium capable of solubilizing at least a portion of the alumina trihydrate under hydrothermal treatment conditions, (iii) at least one active alumina seed component, and (iv) at least one additive component selected from the group of (a) at least one alkali or alkaline earth metal hydroxide or ammonium: silicate, phosphate or sulfate and (b) swellable clay, and (c) mixtures thereof in a manner and under conditions sufficient to disperse the alumina trihydrate and alumina seed component as particles in the liquid medium;
 (B) hydrothermally treating a dispersion provided in accordance with step A at a temperature and for a time sufficient to convert the active alumina and alumina trihydrate to crystalline boehmite having an average crystallite size of from about 20 to about 200 Angstroms and to form composite particles comprising residue of said additive component dispersed within said crystalline boehmite slurried in the liquid medium;
 (C) removing the liquid medium from the composite particles provided in accordance with step B.

12. The process of claim 11 wherein the aluminum trihydrate is gibbsite.

13. The process of claim 12 wherein the gibbsite is separately milled to an average particle size of from about 5 to about 20 microns prior to contact with the active alumina and the additive component.

14. The process of claim 12 wherein the gibbsite, active alumina and additive component are co-milled prior to hydrothermal treatment to impart an average particle size to the gibbsite and active alumina of from about 0.1 to about 15.0 microns.

15. The process of claim 12 wherein the resulting composite particles are washed with an ammonium sulfate solution.

16. The process of claim 12 wherein the additive component comprises a mixture of at least one silicate and at least one hydroxide.

17. The process of claim 12 wherein the additive component comprises a mixture of at least one silicate and at least one phosphate.

18. The process of claim 12 wherein the additive component comprises a mixture of at least one silicate and at least one swellable clay.

19. The process of claim 12 wherein the additive component comprises a mixture of at least one silicate, at least one phosphate, and at least one swellable clay.

20. The process of claim 19 wherein the swellable clay is selected from the group consisting of montmorillonite, hectorite and saponite.

21. The process of claim 19 wherein the additive component comprises at least one member selected from the group of ammonium sulfate, ammonium phosphate, alkali metal silicate, dialkali metal silicate, tetra alkali metal silicate, dialkali metal phosphate, alkali metal polyphosphate, alkali metal sulfate, montmorillonite clay, hectorite clay and saponite clay.

22. Porous agglomerate particles comprising constituent composite particles of an additive component residue dispersed within an aluminum oxide component, wherein:
 (A) the agglomerate particle size is from about 0.5 to about 5 mm;
 (B) the aluminum oxide component comprises at least 70 wt. % (a) crystallite boehmite having a crystallite size of from about 20 to about 200 Angstroms; and (b) gamma alumina derived from said crystalline boehmite; or (c) mixtures thereof;
 (C) the additive component residue is (i) present within the aluminum oxide component at an amount of from about 0.5 to about 10 wt. %, based on the combined weight of the aluminum oxide component and additive, component residue, and (ii) derived from at least one ionic compound having a cation and an anion wherein the cation is selected from the group consisting of ammonium, alkali metal cation, and alkaline earth metal cation and mixtures thereof and the anion is selected from the group consisting of hydroxyl, silicate, phosphate, sulfate and mixtures thereof.

23. The porous agglomerate particles of claim 22 wherein the support agglomerate particles possess:
 (i) a specific surface area of at least about 100 $m^2/g$;
 (ii) an average pore diameter of from about 50 to 500 Angstroms; and
 (iii) a total mercury pore volume of from about 0.2 to about 2.5 cc/g.

24. The porous agglomerate particles of claim 22 wherein the aluminum oxide component is derived from a mixture of gibbsite and active alumina.

25. The porous agglomerate particles of claim 22 wherein the additive component residue is derived from a mixture of at least one silicate and at least one hydroxide.

26. The porous agglomerate particles of claim 22 wherein the additive component residue is derived from a mixture of at least one silicate and at least one phosphate.

27. The porous agglomerate particles of claim 22 wherein the additive component residue is derived from a mixture of at least one silicate, at least one phosphate, and at least one hydroxide.

28. The porous agglomerate particles of claim 22 wherein the additive component residue is derived from a mixture of at least one silicate, at least one phosphate and at least one swellable clay.

29. The porous agglomerate particles of claim 22 wherein the additive component residue comprises at least one member selected from the group consisting of ammonium sulfate, ammonium phosphate, alkali metal silicate, dialkali metal silicate, tetra alkali metal silicate, dialkali metal phosphate, alkali metal polyphosphate, alkali metal sulfate, montmorillonite clay, hectorite clay and saponite clay.

30. The porous agglomerate particles of claim 22 wherein the additive component residue is present therein at from about 0.5 to about 5 wt. % based on the combined weight of the aluminum oxide and additive component residue.

31. The agglomerate particles of any one of claims 22 to 30 impregnated with an amount of at least one catalyst component effective to hydroprocess petroleum feedstock.

32. The agglomerate particles of any one of claims 22 to 30 impregnated with at least one hydrogenation component of a metal having hydrogenation activity selected from the group consisting of Group VIII and Group VIA metals of the Periodic Table.

33. The agglomerate particles of claim 22 which have been calcined at a temperature of from about 300 to about 900° C. for a period of from about 0.1 to about 4 hours.

34. In a process for the hydroprocessing of petroleum feedstock wherein said feedstock is contacted with hydrogen under pressure in the presence of a supported hydroprocessing catalyst, the improvement comprising utilizing porous agglomerate particles as the support for the supported catalyst wherein said porous agglomerate particles comprise constituent composite particles of an additive component residue dispersed within an aluminum oxide component wherein:

(A) the agglomerate particle size is from about 0.5 to about 5 mm;

(B) the aluminum oxide component comprises at least 70 wt. % crystalline boehmite having a crystallite size of from about 20 to about 200 Angstroms; and (b) gamma alumina derived from said crystalline boehmite; or (c) mixtures thereof;

(C) the additive component residue is (i) present within the aluminum oxide component at an amount of from about 0.5 to about 10 wt. % based on the combined weight of the aluminum oxide component and additive component residue and (ii) derived from at least one ionic compound having a cation and an anion wherein the cation is selected from the group consisting of ammonium, alkali metal cation, alkaline earth metal cation, and mixtures thereof and the anion is selected from the group of hydroxyl, silicate, phosphate, sulfate and mixtures thereof.

35. The process of claim 34 wherein the support agglomerate particles possess:

(i) a specific surface area of at least about 100 $m^2/g$;

(ii) an average pore diameter of from about 50 to 500 Angstroms; and (iii) a total mercury pore volume of from about 0.2 to about 2.5 cc/g.

36. Porous composite particles comprising an aluminum oxide component and additive component residue dispersed within the aluminum oxide component, and having:

(A) a specific surface area of at least about 80 $m^2/g$;

(B) an average nitrogen pore diameter of from about 60 to 1,000 Angstroms; and (C) a total nitrogen pore volume of from about 0.2 to about 2.5 cc/g; and prepared by the process comprising:

(A) admixing (i) alumina trihydrate, (ii) liquid medium capable of solubilizing at least a portion of the alumina trihydrate under hydrothermal treatment conditions, (iii) at least one active alumina seed component, and (iv) at least one additive component selected from the group consisting of (a) alkali or alkaline earth metal hydroxide, silicate, phosphate or sulfate and (b) swellable clay, in a manner and under conditions sufficient to disperse the alumina trihydrate and alumina seed component as particles having an average particle size of from about 1 to about 15 microns in the liquid medium;

(B) hydrothermally treating a dispersion provided in accordance with step A at a temperature and for a time sufficient to convert the active alumina and alumina trihydrate to crystalline boehmite having an average crystallite size of from about 20 to about 200 Angstroms and to form composite particles comprising residue of said additive component dispersed within said crystalline boehmite slurried in the liquid medium;

(C) removing the liquid medium from the composite particles provided in accordance with step B.

* * * * *